US010171724B2

(12) United States Patent
Ito

(10) Patent No.: US 10,171,724 B2
(45) Date of Patent: Jan. 1, 2019

(54) FOCAL POINT ADJUSTMENT DEVICE AND FOCAL POINT ADJUSTMENT METHOD

(71) Applicant: Olympus Corporation, Hachioji-shi, Tokyo (JP)

(72) Inventor: Kazumi Ito, Fuchu (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/489,972

(22) Filed: Apr. 18, 2017

(65) Prior Publication Data

US 2017/0223259 A1 Aug. 3, 2017

Related U.S. Application Data

(63) Continuation of application No. PCT/JP2015/059037, filed on May 25, 2015.

(30) Foreign Application Priority Data

Oct. 30, 2014 (JP) .................................. 2014-221450

(51) Int. Cl.
H04N 5/232 (2006.01)

(52) U.S. Cl.
CPC ..... *H04N 5/23212* (2013.01); *H04N 5/23287* (2013.01); *H04N 5/23264* (2013.01)

(58) Field of Classification Search
CPC ........................ H04N 5/23212; H04N 5/23287
See application file for complete search history.

(56) References Cited

U.S. PATENT DOCUMENTS

| | | | |
|---|---|---|---|
| 2009/0295964 A1 | 12/2009 | Utagawa | |
| 2011/0164165 A1* | 7/2011 | Hashimoto | G02B 7/36 348/340 |
| 2012/0268613 A1 | 10/2012 | Nishio | |

FOREIGN PATENT DOCUMENTS

| | | |
|---|---|---|
| JP | 2007-189312 | 7/2007 |
| JP | 2011-259168 | 12/2011 |

OTHER PUBLICATIONS

International Search Report to corresponding PCT Application No. PCT/JP2015/059037, dated Jun. 23, 2015 (2 pgs.), with translation (2 pgs.).

* cited by examiner

*Primary Examiner* — Ahmed A Berhan
(74) *Attorney, Agent, or Firm* — John C. Pokotylo; Pokotylo Patent Services

(57) ABSTRACT

There is provided a focal point adjustment device, comprising: a first memory to store information on an emission angular range of a light flux emitted toward an image sensor; a second memory to store the information on characteristics of the image sensor; a camera-shake preventing mechanism to correct camera shake by moving the image sensor, and to correct camera shake by rotating the image sensor in a plane perpendicular to the optical axis of the photographic lens and also output information on the movement and information on the rotation; and a calculation circuit to correct image height information at a range-finding position where the output of the focal point detection pixel is used, based on the information on the movement and the information on the rotation output by the camera-shake preventing mechanism, and calculate information for the focal point adjustment, based on the corrected image height information.

16 Claims, 17 Drawing Sheets

FIG. 9A

|   | 1 | 2 | 3 | 4 | 5 | 6 | 7 | 8 | 9 |
|---|---|---|---|---|---|---|---|---|---|
| a |   |   |   |   |   |   |   |   |   |
| b |   |   |   | 12 | 11 | 12 |   |   |   |
| c |   |   | 10 | 9 | 8 | 9 | 10 |   |   |
| d |   | 7 | 6 | 5 | 4 | 5 | 6 | 7 |   |
| e |   | 3 | 2 | 1 | 0 | 1 | 2 | 3 |   |
| f |   | 7 | 6 | 5 | 4 | 5 | 6 | 7 |   |
| g |   |   | 10 | 9 | 8 | 9 | 10 |   |   |
| h |   |   |   | 12 | 11 | 12 |   |   |   |
| i |   |   |   |   |   |   |   |   |   |

FIG. 9B

|    |    | Lo | | | | | | | | |
|----|----|-----|-----|-----|-----|-----|-----|-----|-----|-----|
|    |    | −24 | −21 | −18 | −15 | −12 | −9 | −6 | −3 | 0 |
| UP | −3 | 0.649 | 0.580 | 0.680 | 0.872 | 1.237 | 2.127 | #N/A | #N/A | #N/A |
|    | 0 | 0.278 | 0.265 | 0.298 | 0.350 | 0.434 | 0.579 | 0.937 | #N/A | #N/A |
|    | 3 | 0.143 | 0.141 | 0.156 | 0.177 | 0.209 | 0.258 | 0.366 | 0.682 | #N/A |
|    | 6 | 0.097 | 0.097 | 0.107 | 0.120 | 0.139 | 0.167 | 0.226 | 0.373 | 0.988 |
|    | 9 | 0.076 | 0.077 | 0.084 | 0.094 | 0.108 | 0.128 | 0.169 | 0.265 | #N/A |
|    | 12 | 0.066 | 0.067 | 0.073 | 0.081 | 0.092 | 0.108 | 0.141 | #N/A | #N/A |
|    | 15 | 0.059 | 0.060 | 0.065 | 0.072 | 0.081 | 0.094 | #N/A | #N/A | #N/A |
|    | 18 | 0.055 | 0.055 | 0.059 | 0.065 | 0.073 | #N/A | #N/A | #N/A | #N/A |
|    | 21 | 0.051 | 0.051 | 0.055 | 0.060 | #N/A | #N/A | #N/A | #N/A | #N/A |
|    | 24 | 0.050 | 0.048 | 0.052 | #N/A | #N/A | #N/A | #N/A | #N/A | #N/A |

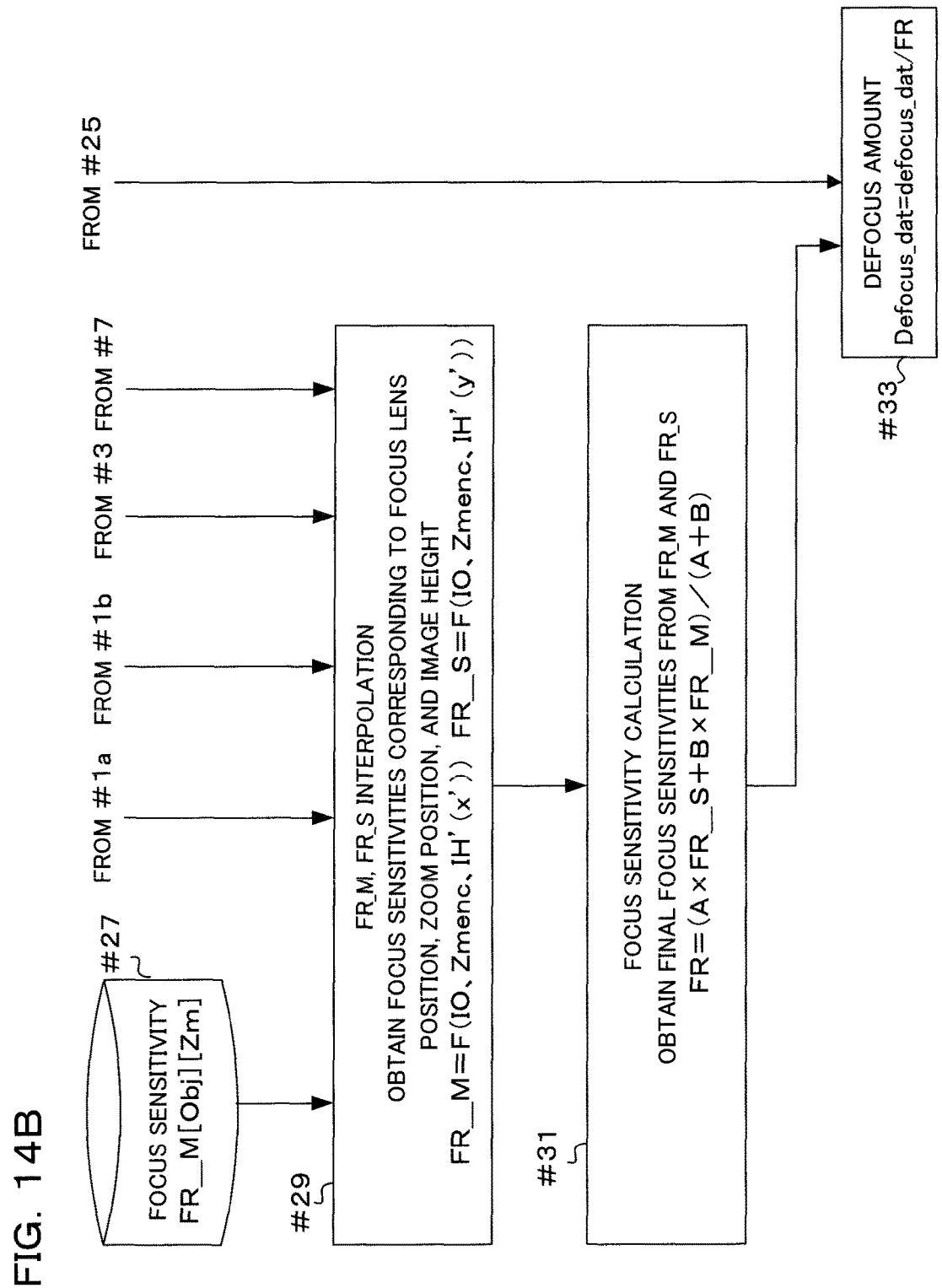

FOCAL POINT ADJUSTMENT DEVICE AND FOCAL POINT ADJUSTMENT METHOD

CROSS-REFERENCE TO RELATED APPLICATIONS

This application is a Continuation Application of PCT Application No. PCT/JP2015/059037, filed on Mar. 25, 2015 and based upon and claiming the benefit of priority from prior Japanese Patent Application No. 2014-221450, filed on Oct. 30, 2014, the entire contents of all of which are incorporated herein by reference.

BACKGROUND OF THE INVENTION

1. Field of the Invention

The present invention relates to a focal point adjustment device and a focal point adjustment method for performing focal point adjustment by a phase-difference AF (Auto Focus) system, based on the output of an image sensor including an imaging pixel and a focal point detection pixel.

2. Description of Related Art

There is known a focal point adjustment device that arrays a focal point detection pixel in a part within a two-dimensional array of imaging pixels to capture a subject image formed by a photographic optical system and also adjusts the focal point of the photographic optical system by a pupil division phase difference method. With the image sensor of this focal point adjustment device, the incident angle to a photoelectric conversion element of the focal point detection pixel of each of a pair of focal point detection light fluxes having passed through different regions on the exit pupil of the photographic optical system varies as the distance from a point where the image sensor intersects with the optical axis of the photographic optical system becomes larger in the light receiving surface of the image sensor, resulting in a decrease in focal point detection accuracy.

Then, in order to solve this problem, there has been proposed a focal point adjustment device adapted to set, in accordance with the image height in the light receiving surface of an image sensor, the positional relationship between a micro lens for pupil division and a focal point detection pixel (see Japanese Laid-Open Patent Publication No. 2009-290157 (hereinafter, referred to as "Patent Literature 1")).

The device in Patent Literature 1 is capable of reducing an error caused by the image height of a focal point detection pixel. However, because the AF (Auto Focus) characteristics will vary not only with the image height but also with the states of the focal length, focus position, aperture, and the like, of a photographic optical system, correction needs to be performed in accordance with the states of the optical system.

Furthermore, when the focal point adjustment device includes the so-called camera-shake preventing mechanism for driving an image sensor in the plane perpendicular to the optical axis of a photographic optical system in accordance with camera shake in performing camera-shake correction, the device cannot eliminate an error caused by a relative change of an image height due to the movement of the image sensor. In particular, when an image sensor rotationally moves about the rotation center thereof, the movement becomes complicated and it is not easy to eliminate the error.

In addition, for a micro lens provided on an image sensor, in terms of the manufacturing process, a relative positional shift may occur between a portion constituting a light receiving element and a portion constituting a microlens array, and it is also not easy to eliminate an error caused by this relative positional shift.

SUMMARY OF THE INVENTION

The present invention aims to provide a focal point adjustment device and a focal point adjustment method capable of performing appropriate correction in accordance with the states of a photographic lens and/or image sensor.

A focal point adjustment device according to a first aspect of the present invention comprises: an image sensor having an imaging pixel and a focal point detection pixel, each of which receives a light flux having passed through a photographic lens and performs photoelectric conversion to output an image signal; a first memory to store information on an emission angular range of a light flux emitted toward the image sensor; a second memory to store information on characteristics of the image sensor; a camera-shake preventing mechanism to correct camera shake by moving the image sensor in a direction perpendicular to an optical axis of the photographic lens, and to correct camera shake by rotating the image sensor in a plane perpendicular to the optical axis of the photographic lens and also output information on the movement and information on the rotation; and a calculation circuit to calculate information for focal point adjustment based on an output of the focal point detection pixel, based on an output of the first memory, an output of the second memory, and an output of the camera-shake preventing mechanism, wherein the calculation circuit corrects image height information at a range-finding position where the output of the focal point detection pixel is used, based on the information on the movement and the information on the rotation output by the camera-shake preventing mechanism, and calculates information for the focal point adjustment, based on the corrected image height information.

A focal point adjustment method according to a second aspect of the present invention is a focal point adjustment method for an imaging device including: an image sensor having an imaging pixel and a focal point detection pixel, each of which receives a light flux having passed through a photographic lens and performs photoelectric conversion to output an image signal; a memory to store information on an emission angular range of a light flux emitted toward the image sensor and information on characteristics of the image sensor; and a camera-shake preventing mechanism to correct camera shake by moving the image sensor in a direction perpendicular to an optical axis of the photographic lens, and to correct camera shake by rotating the image sensor in a plane perpendicular to the optical axis of the photographic lens and also output information on the movement and information on the rotation, the focal point adjustment method comprising: setting a focal point detection region for the image sensor; generating a focal point adjustment signal, based on outputs of a plurality of focal point detection pixels included in the focal point detection region; and correcting image height information at a position of the focal point detection region, based on an output of the memory, the information on the movement output by the camera-shake preventing mechanism, and the information on the rotation and calculating information for generating the focal point adjustment signal, based on the corrected image height information.

BRIEF DESCRIPTION OF THE DRAWINGS

FIG. 9A and FIG. 9B are diagrams each illustrating a table for correcting the AF sensitivity with an image height, in an embodiment of the present invention.

FIG. 14A and FIG. 14B are diagrams illustrating a processing flow for calculating the defocus amount of a camera according to an embodiment of the present invention.

DETAILED DESCRIPTION OF THE PREFERRED EMBODIMENTS

Hereinafter, preferred embodiments will be explained using a digital camera, to which the present invention is applied (hereinafter, abbreviated a "camera"), according to the drawings. Before explaining the specific configuration of a camera according to the present embodiment, AF sensitivity used for focal point detection and the change factors of the AF sensitivity will be explained.

Figure 1:
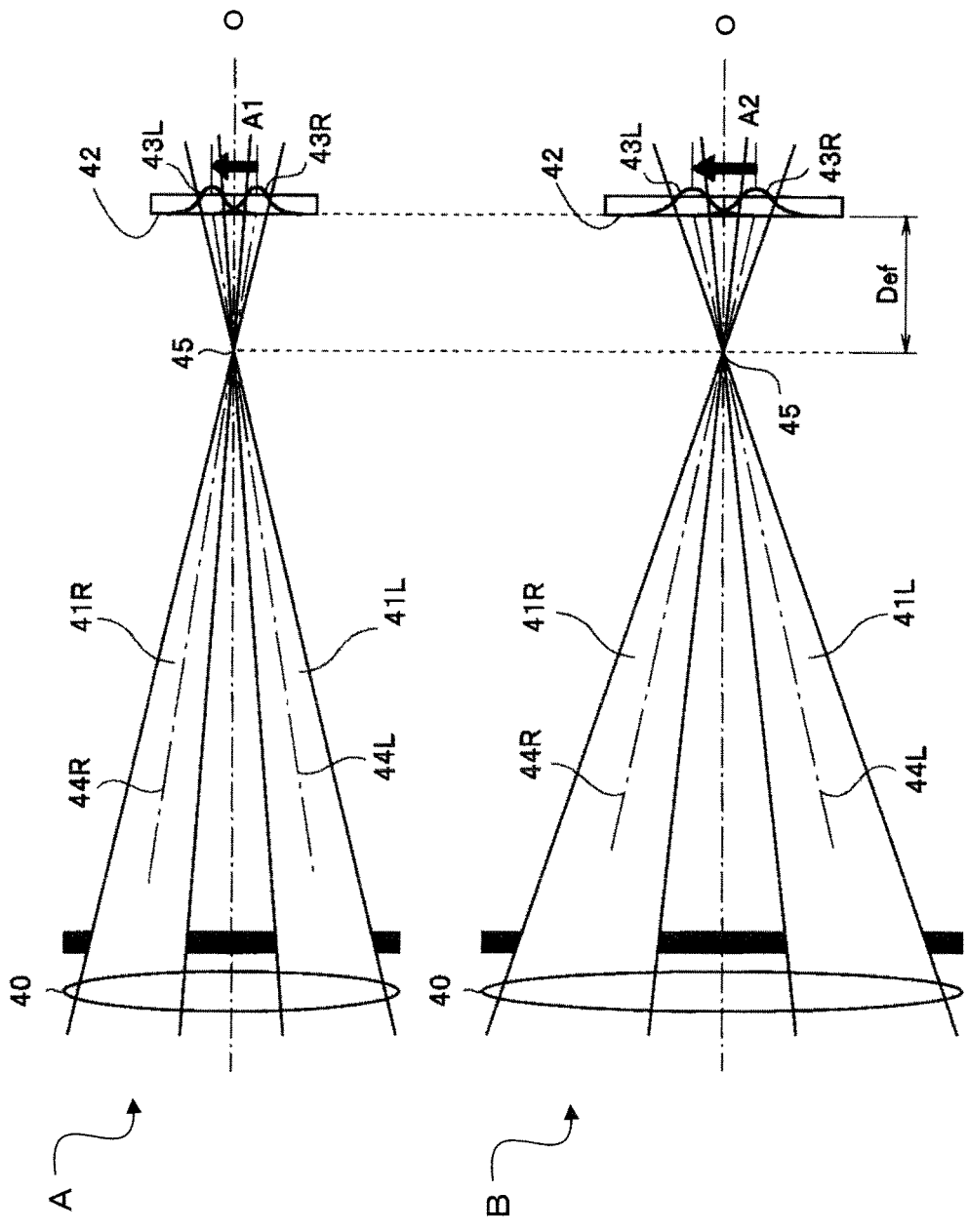
FIG. 1 is a diagram explaining a relationship between an F value (FNo) and two images in a pupil division phase difference method, in an embodiment of the present invention.

FIG. 1 is a diagram explaining a relationship between an F value and a two-image interval in a pupil division phase difference method. The upper part A of FIG. 1 illustrates an example when the F value is large, while the lower part B of FIG. 1 illustrates an example when the F value is small. FIG. 1 illustrates how a right light flux 41R and a left light flux 41L in the pupil division phase difference method are incident on an imaging plane 42. Although an aperture is depicted on an optical axis O near a lens in FIG. 1 for the purpose of explaining the principle, actually an image sensor includes light flux dividing means for pupil division (in the present embodiment, a macro lens).

In the pupil division phase difference method, each optical path from a subject is divided, at an exit pupil, into two: one in the right direction and one in the left direction, for example, and the light flux from the right direction (right light flux) and the light flux from the left direction (left light flux) are made incident on an imaging plane (light receiving surface) of an image sensor. A pixel which receives the right light flux (hereinafter, referred to as an R pixel) and a pixel which receives the left light flux (hereinafter, referred to as an L pixel) are provided in the image sensor, and the right light flux and left light flux are separately caused to form images on respective imaging planes of the R pixel and L pixel.

In FIG. 1, a right image 43R formed by a right light flux 41R incident via a lens 40 is obtained with the R pixel, while a left image 43L formed by a left light flux 41L is obtained with the L pixel. The shift amount and shift direction on an imaging plane 42 between these right image 43R and left image 43L correspond to the defocus amount and defocus direction. The distance on the imaging plane 42 between a main light beam 44R of the right light flux 41R and a main light beam 44L of the left light flux 41L is a two-image interval A1 (indicated by a filled arrow), and the two-image interval A1 is proportional to the distance (defocus amount) between the imaging plane 42 and a focal point 45. This proportionality coefficient is the AF sensitivity, and if the AF sensitivity in the upper part A of FIG. 1 is denoted by $\alpha1$, a defocus amount Def can be expressed by Def=$\alpha1 \times A1$.

Because the two-image interval can be obtained from the outputs of an R pixel and L pixel, the defocus amount can be calculated once the AF sensitivity is obtained. The AF sensitivity can be obtained from an AF calculation parameter which is based on the characteristics of the lens and/or image sensor.

The lower part B of FIG. 1 illustrates an example when the effective aperture of the lens 40 is changed with respect to the upper part A of FIG. 1. The defocus amount Def in the lower part B of FIG. 1 illustrates an example when it coincides with the defocus amount Def in the upper part A of FIG. 1. If the two-image interval in the lower part B of FIG. 1 is denoted by A2 and the AF sensitivity obtained from the AF calculation parameter is denoted by $\alpha2$, the defocus amount Def can be expressed by Def=$\alpha2 \times A2$.

The example illustrated in FIG. 1 indicates that the two-image interval changes with FNo even if the defocus amount Def is fixed. That is, the example of FIG. 1 indicates that the AF sensitivity changes with FNo, and also indicates that the information on the effective aperture, e.g., the F value, can be used as the AF calculation parameter for obtaining the AF sensitivity. In the example of FIG. 1, the defocus amount can be calculated from the information on the two-image interval and the F value.

However, the F value is defined by the light beam on the optical axis O. Then, in the present embodiment, for the parameter representing the effective aperture of the light flux for a focal point detection pixel positioned outside the optical axis O, the information on the value equivalent to FNo (CF) is used as the AF calculation parameter also in the peripheral light flux.

Figure 2A:
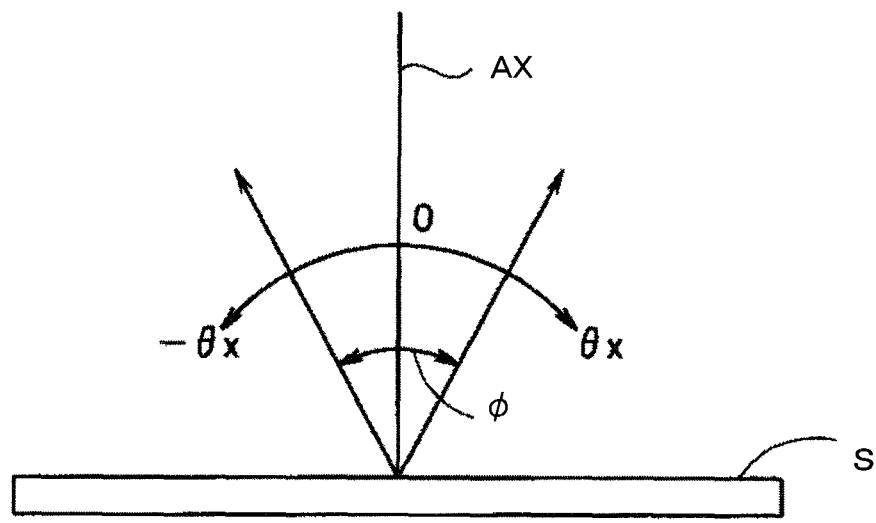
FIG. 2A and FIG. 2B are diagrams explaining sensitivity characteristics of a focal point detection pixel, in an embodiment of the present invention.
Figure 2B:
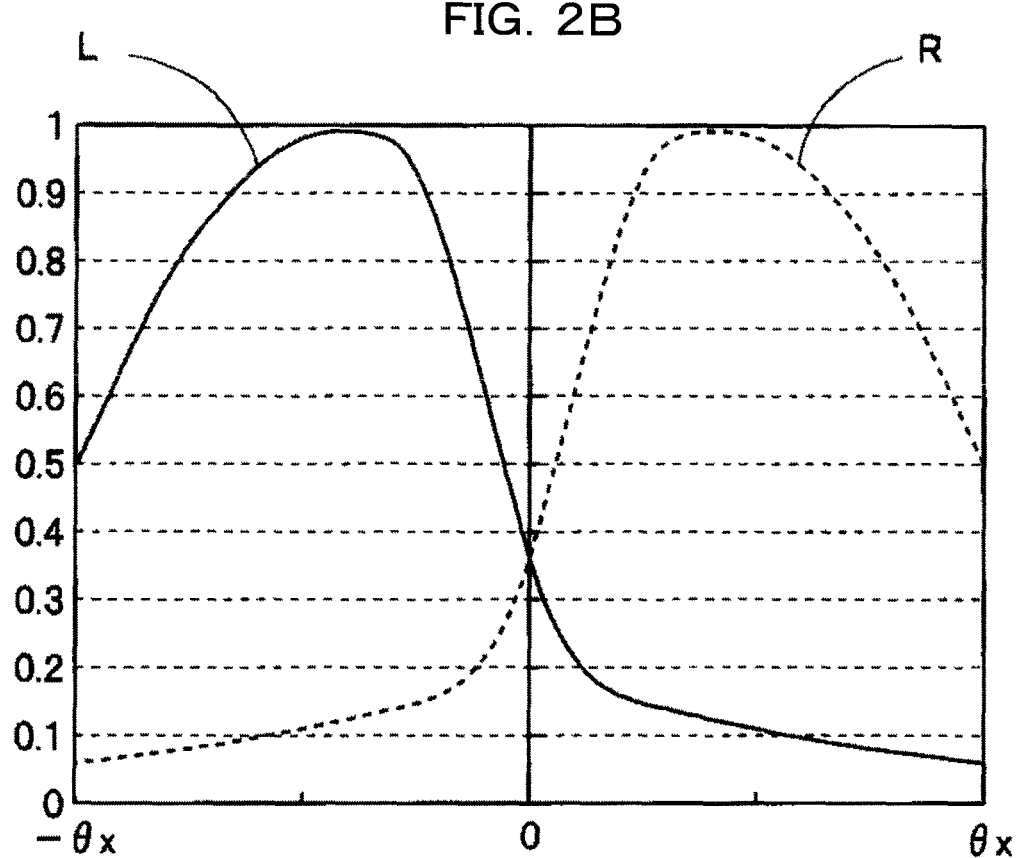

FIG. 2A and FIG. 2B are the explanatory views for explaining the light receiving sensitivity characteristics of a focal point detection pixel. FIG. 2A illustrates a range φ of incident angle (light beam incident angle θx) in the pupil division direction of a light flux (image-forming light flux) incident on a light receiving surface S. As illustrated in FIG. 2A, the light beam incident angle θx, with an axis AX perpendicular to the light receiving surface S set to 0 degree, is expressed by an angle between the axis perpendicular to the light receiving surface and the light beam incident angle, in the positive/negative direction.

FIG. 2B illustrates the characteristic (indicated by a solid line L) of the light receiving sensitivity of an L pixel which receives the left light flux having passed through the left pupil and the characteristic (indicated by a dashed line R) of an R pixel which receives the right light flux having passed through the right pupil. Here, the horizontal axis represents the light beam incident angle θ and the vertical axis represents the light receiving sensitivity. Note that, FIG. 2B illustrates the light receiving sensitivity characteristics of a focal point detection pixel positioned on the optical axis O, in which the light receiving sensitivity characteristics of the L pixel and R pixel are substantially symmetrical with respect to the light beam incident angle 0.

Figure 3:
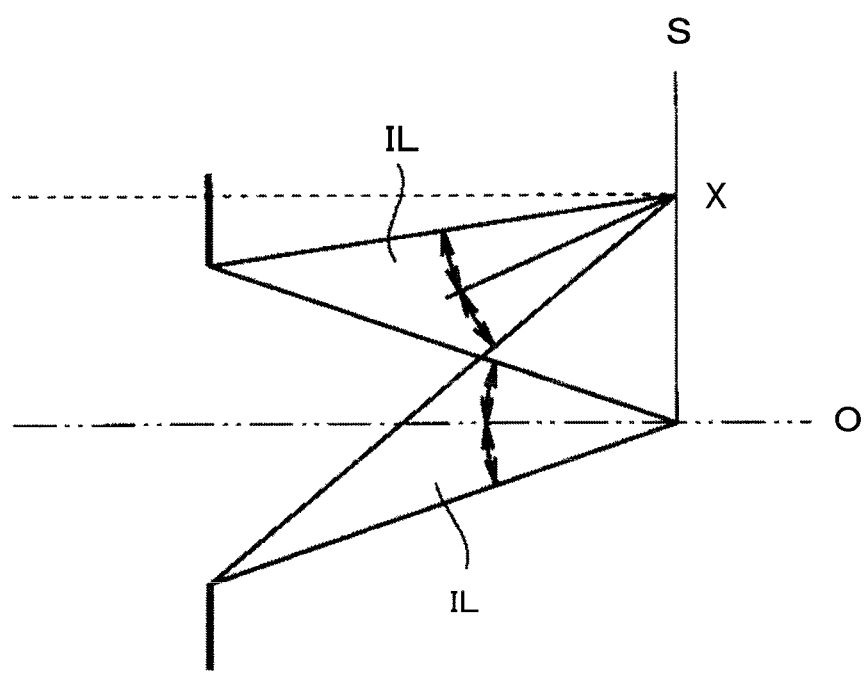
FIG. 3 is a diagram explaining states of an incident angle of an image-forming light flux to a focal point detection pixel outside the optical axis, in an embodiment of the present invention.

As illustrated in FIG. 3, an off-axis light flux (light flux corresponding to an image height X of the light receiving surface S) may have a gradient with respect to the optical axis O. In AF calculation using a focal point detection pixel outside the optical axis, an AF sensitivity different from the AF sensitivity used for a light flux on the optical axis O needs to be calculated. A range of the light flux is used in order to calculate the AF sensitivity, but an appropriate AF sensitivity cannot be obtained only by using the corrected F value representing the width of the light flux and thus a value indicative of the gradient of the light flux is also used.

The light receiving sensitivity of a focal point detection pixel has an angular characteristic in the pupil division direction. In the present embodiment, the AF sensitivity is calculated from the angular range of an image-forming light flux IL and the angular characteristic of a focal point detection pixel. That is, in the present embodiment, the information on the sensitivities of L and R pixels and the information on the angular range of the image-forming light flux IL incident on the L and R pixels (the corrected F value representing the width of a light flux and the gradient of the light flux) are used as the AF calculation parameters for obtaining an appropriate AF sensitivity.

Figure 4:
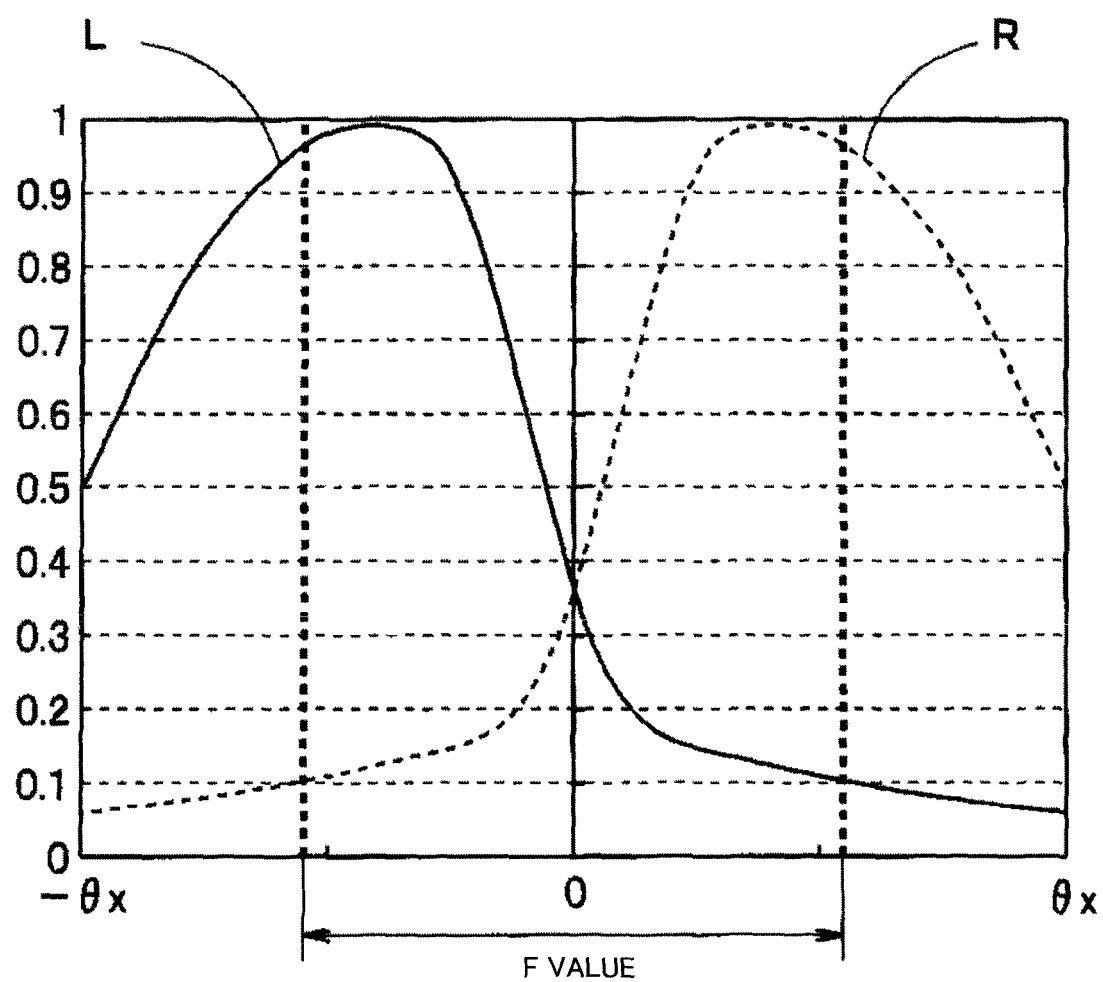
FIG. 4 is a diagram explaining a relationship between the angular range of an image-forming light flux and AF sensitivity regarding a focal point detection pixel on the optical axis, in an embodiment of the present invention.
Figure 5:
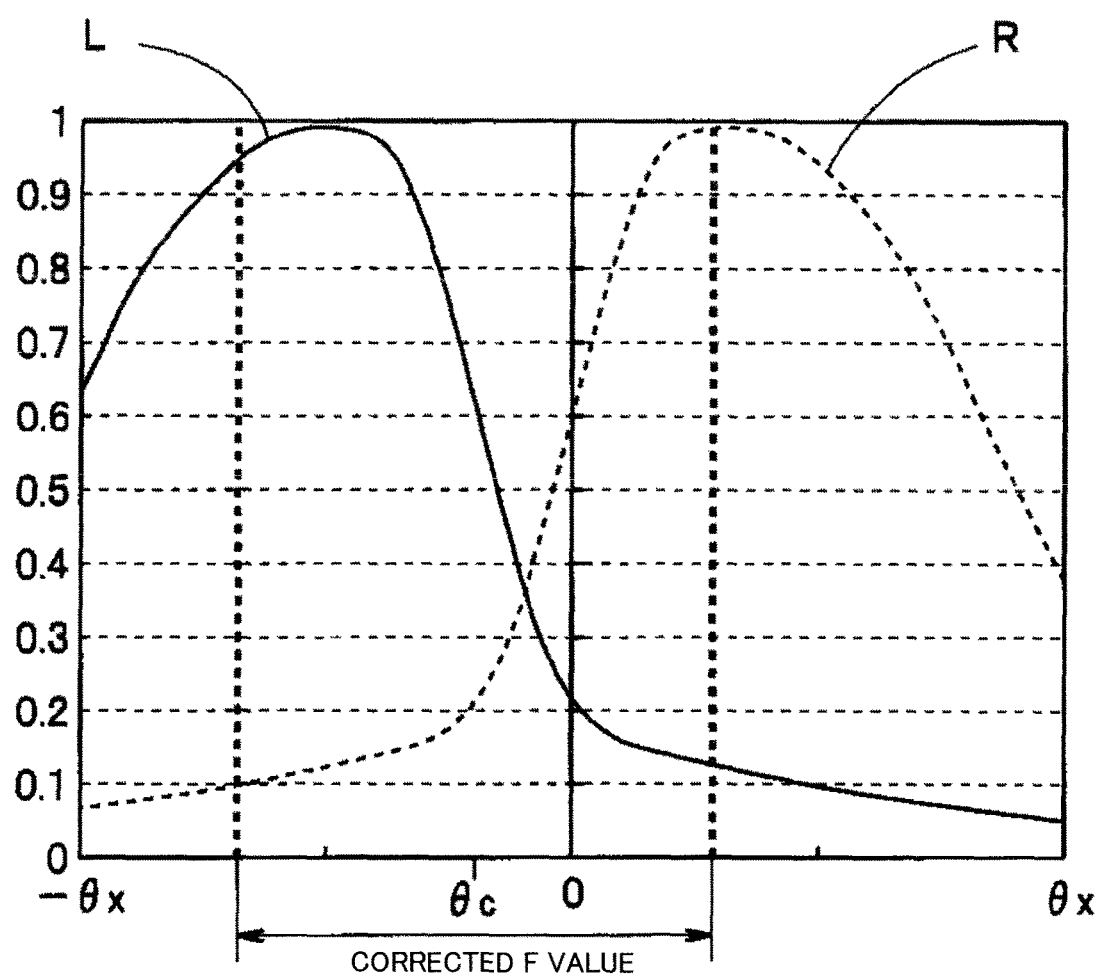
FIG. 5 is a diagram explaining a relationship between the angular range of an image-forming light flux and AF sensitivity regarding a focal point detection pixel outside the optical axis, in an embodiment of the present invention.

FIG. 4 and FIG. 5 are the explanatory views for explaining the relationship between the angular range of the image-forming light flux IL and the AF sensitivity. FIG. 4 illustrates a focal point detection pixel on the optical axis O, in which the light receiving sensitivity characteristics of the L pixel and R pixel are symmetrical. On the other hand, FIG. 5 illustrates a focal point detection pixel outside the optical axis, in which the light receiving sensitivity characteristics of the L pixel and R pixel are asymmetrical.

As illustrated in FIG. 4, for example the image-forming light flux IL in an angular range indicated by a dashed solid line is incident on a focal point detection pixel on the optical axis. This image-forming light flux IL is symmetrical with respect to the optical axis as illustrated in FIG. 4, and an angular difference between the maximum incident angle and the minimum incident angle corresponds to an F value.

Moreover, the maximum incident angle and the minimum incident angle of the image-forming light flux IL in a focal point detection pixel outside the optical axis shifts in accordance with the image height X illustrated in FIG. 3, resulting in an angular range indicated by the dashed solid line of FIG. 5, for example. Note that, the angular difference between the maximum incident angle and the minimum incident angle of the image-forming light flux IL in this case is not illustrated in FIG. 3, but accurately corresponds to a corrected F value. Accordingly, the information on the maximum incident angle and the minimum incident angle of the image-forming light flux IL can be obtained by using the corrected F value and the incident angle of a light beam passing through the center of the image-forming light flux IL (hereinafter, referred to as an image-forming light flux incident angle).

In the present embodiment, for the purpose of simplifying the calculation, the range of a light flux incident on a focal point detection pixel is obtained using the information on the corrected F value and image-forming light flux incident angle (in the central direction of the image-forming light flux IL), and thereby the AF sensitivity is obtained. In this case, the incident angle of the image-forming light flux IL incident at a predetermined image height on the light receiving surface is influenced by the aberration of an optical system between the aperture and the light receiving surface, and the like and therefore differs for each optical system. Then, in the present embodiment, the information on an image-forming light flux incident angle corresponding to an image height on the light receiving surface S obtained in an optical system is used as the AF calculation parameter.

Figure 6A:
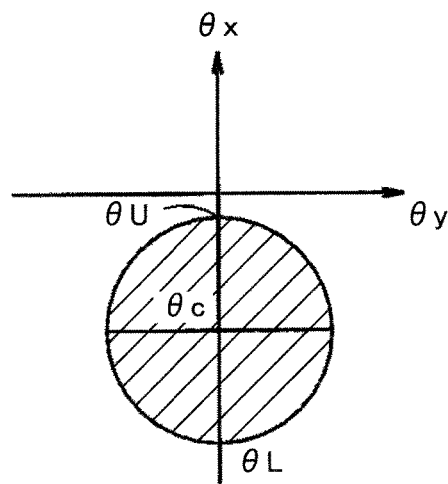
FIG. 6A and FIG. 6B are diagrams explaining an effective aperture and an image-forming light flux incident angle $\theta_C$ in the central direction of an image-forming light flux, regarding an incident light flux incident on a focal point detection pixel of an image height X, in an embodiment of the present invention.
Figure 6B:
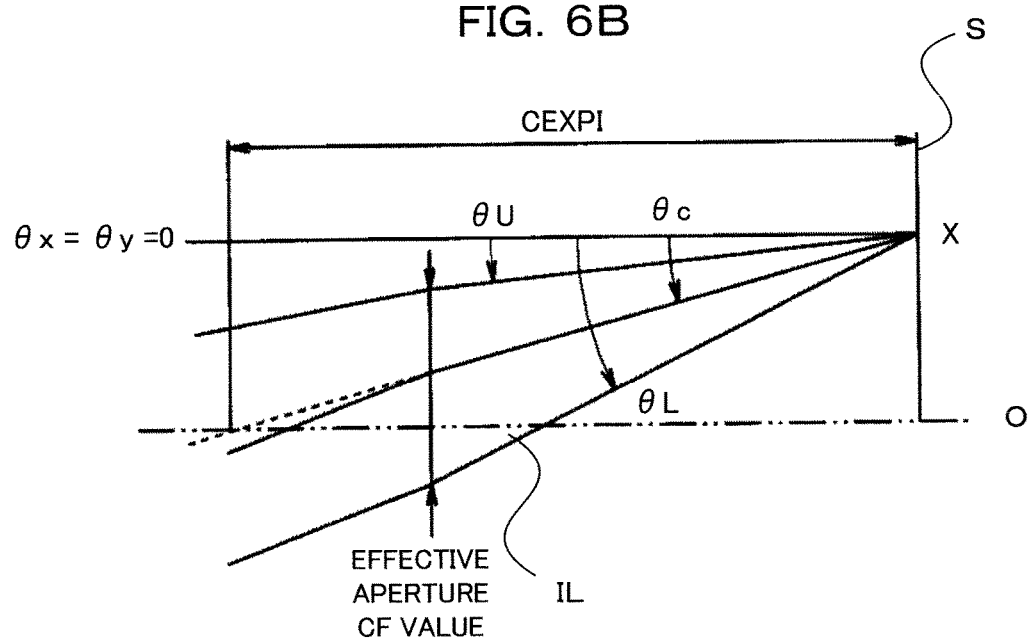

FIG. 6A and FIG. 6B are the explanatory diagrams, about an incident light flux incident on a focal point detection pixel of the image height X, for explaining an effective aperture (corrected F value) and an image-forming light flux incident angle $\theta_c$ in the central direction of the image-forming light flux IL. FIG. 6A illustrates the angular range of a pupil seen from the image height X. In the image height X direction, the image-forming light flux IL exists in a range from an incident angle $\theta_L$ to an incident angle $\theta_U$, and the center thereof is the image-forming light flux incident angle $\theta_C$.

Furthermore, the light beam incident angle onto the light receiving surface S one-to-one corresponds to the position of an intersection between a light beam (dashed line of FIG. 6B) passing through the center of the image-forming light flux IL and the optical axis O. The rate of change of this position is comparatively small relative to the rate of change of the image-forming light beam incident angle $\theta_C$. Therefore, use of the information on this position in place of the information on the image-forming light flux incident angle $\theta_C$ allows for highly accurate control with a comparatively small number of bits. In the present embodiment, hereinafter this position, i.e., the position at which a straight line passing through the center of the image-forming light flux IL intersects with the optical axis O, shall be referred to as a corrected exit pupil position (CEXPI). Note that, usually this corrected exit pupil position may differ from the exit pupil position defined as the paraxial amount.

Note that the corrected exit pupil position (CEXPI) can be expressed by Formula (1) below, and the corrected F value (CF) can be expressed by Formula (2) below.

$$\text{Tan } \theta_c = (\text{Tan } \theta_U + \text{Tan } \theta_L)/2$$

$$CEXPI = x/\text{Tan } \theta_c \qquad (1)$$

$$CF = \text{Tan } \theta_L - \text{Tan } \theta_U \qquad (2)$$

As described above, in the present embodiment, as the AF calculation parameters, the corrected F value (CF) and the information on the corrected exit pupil position (CEXPI) corrected in accordance with an image height are used. Because these pieces of information result in different values for each optical system, the information from each optical system is used. Moreover, because the corrected exit pupil position (CEXPI) may be at an infinite distance depending on the value of the image-forming light flux incident angle $\theta_C$, the value of the inverse number of the corrected exit pupil position (CEXPI) is preferably used as the AF calculation parameter.

In the present embodiment, as the AF calculation parameters on the lens side of a camera, the corrected F value (CF) corrected in accordance with an image height and the information on the corrected exit pupil position (CEXPI) corrected in accordance with an image height are used, while as the AF calculation parameters on the body side of the camera, the light receiving sensitivity characteristics of a focal point detection pixel is used. The AF calculation parameters on the lens side are the lens-side specific values based on an optical design, while the AF calculation parameters on the body side are the body-side specific values based on the design of an image sensor. Accordingly, these AF calculation parameters are held on the lens-side and on the body side, respectively, so that even when the type on the lens side and the type on the body side change, respectively, the AF calculation parameters on the lens side and on the body side can be used, thereby allowing for highly accurate AF calculation.

Figure 7:
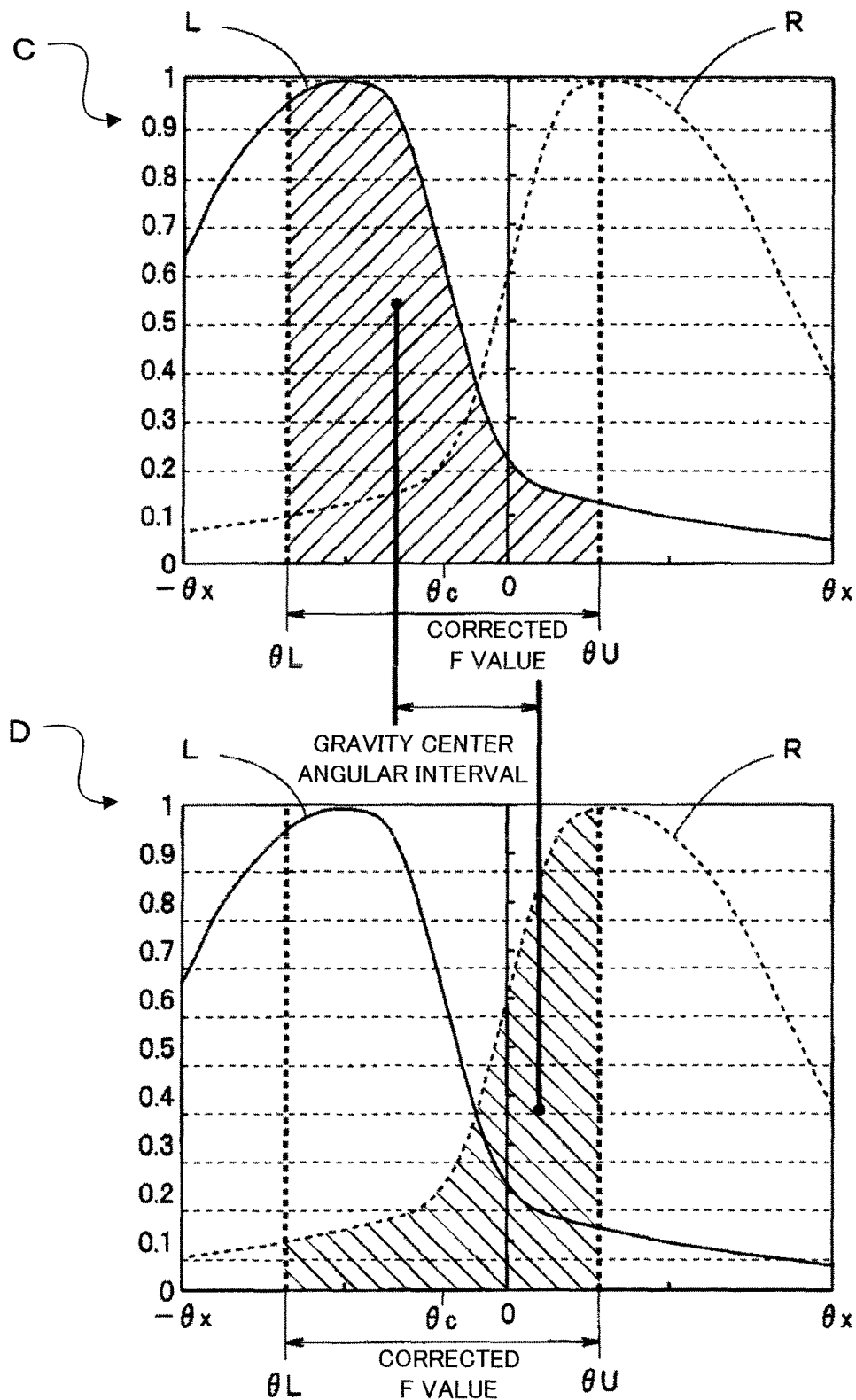
FIG. 7 is a diagram explaining a relationship among the sensitivity of a focal point detection pixel of an image height X outside the optical axis, the incident angular range of an image-forming light flux, and the AF sensitivity, in an embodiment of the present invention.

FIG. 7 is the diagram for explaining a relationship among the light receiving sensitivity of a focal point detection pixel of an image height X outside the optical axis, the incident angular range of the image-forming light flux IL, and the AF sensitivity. A solid line L indicates the light receiving sensitivity of an L pixel, while a dashed line R indicates the light receiving sensitivity of an R pixel. Assume that the image-forming light flux IL is incident on a focal point detection pixel having the sensitivity characteristic of FIG. 7, within an angular range indicated by dashed solid lines. That is, FIG. 7 indicates that the image-forming light flux IL is incident only within the angular range corresponding to the corrected F value (CF) centering on the image-forming light flux incident angle $\theta_C$.

The light receiving amount of an L pixel can be expressed by the hatched portion of a graph C on the upper side of FIG. 7, while the light receiving amount of an R pixel can be expressed by the hatched portion of a graph D on the lower side of FIG. 7. It can be considered that the gravity center position of the hatched region of the graph C of FIG. 7 corresponds to the incidence direction of the left light flux, while the gravity center position of the hatched region of the graph D of FIG. 7 corresponds to the incidence direction of the right light flux. Then, it is considered that the angular interval between these gravity center positions (a gravity center angular interval) may be proportional to the AF sensitivity.

That is, gravity center angles GL and GR can be expressed by Formulae (3) and (4) below, and the AF sensitivity (AFsen) can be expressed by Formula (5) below which is the interval between gravity center angles multiplied by a predetermined constant A. Here, the light receiving sensitivity characteristics of the L and R pixels are denoted by fL and fR, respectively. Note that, actually, as indicated by the hatched portion of FIG. 6A, the light flux has two dimensions of θx and θy, and therefore the gravity center angle GL is expressed by Formula (6) (the gravity center angle GR is similarly expressed, so the formula thereof is omitted).

$$GL = \frac{\int_{\theta L}^{\theta U} f_L(\theta x) \cdot \theta x \cdot d\theta x}{\int_{\theta L}^{\theta U} f_L(\theta x) \cdot d\theta x} \qquad (3)$$

$$GR = \frac{\int_{\theta L}^{\theta U} f_R(\theta x) \cdot \theta x \cdot d\theta x}{\int_{\theta L}^{\theta U} f_R(\theta x) \cdot d\theta x} \qquad (4)$$

$$AFsen = |GL - GR| \times A \qquad (5)$$

$$GL = \frac{\int\int_{\theta L}^{\theta U} f_L(\theta x, \theta y) \cdot \theta x \cdot \theta y \cdot d\theta x \cdot d\theta y}{\int\int_{\theta L}^{\theta U} f_L(\theta x, \theta y) \cdot d\theta x \cdot d\theta y} \qquad (6)$$

Note that, although FIG. 7 illustrates the light receiving sensitivity characteristics of a focal point detection pixel of a predetermined image height, the light receiving sensitivity characteristics of a focal point detection pixel change with the image height. Accordingly, on the body side, the information on the light receiving sensitivity characteristics of a focal point detection pixel for each image height is held and used.

Moreover, the areas of the hatched regions of the graphs C and D of FIG. 7 correspond to the light receiving amounts of the L and R pixels, respectively. If there is a difference in the light receiving amount between the L and R pixels for the same subject, an L image based on the output of the L pixel will differ from an R image based on the output of the R pixel, and thus it is difficult to detect the two-image interval. Then, L and R image signals are subjected to illuminance correction (shading correction) in accordance with the areas of the hatched regions of the graphs C and D of FIG. 7, respectively, thereby facilitating detection of the two-image interval.

Note that, the area SL of the hatched portion of the graph C of FIG. 7 and the area SR of the hatched portion of the graph D of FIG. 7 can be expressed by Formulae (7) and (8) below, and an illuminance correction coefficient (ICC) can be expressed by Formula (9) below. The illuminance correction is performed by multiplying the output of the L pixel by this illuminance correction coefficient (ICC). Note that, actually, as illustrated by the hatched portion of FIG. 6A, the light flux has two dimensions of θx and θy, and therefore the area SL is expressed by Formula (10) (the area SR is expressed similarly, so the formula thereof is omitted).

$$SL = \int_{\theta L}^{\theta U} f_L(\theta x) \cdot d\theta x \qquad (7)$$

$$SR = \int_{\theta L}^{\theta U} f_R(\theta x) \cdot d\theta x \qquad (8)$$

$$ICC = SR/SL \qquad (9)$$

$$SL = \iint f_L(\theta x, \theta y) \cdot d\theta x \cdot d\theta y \qquad (10)$$

Figure 8A:
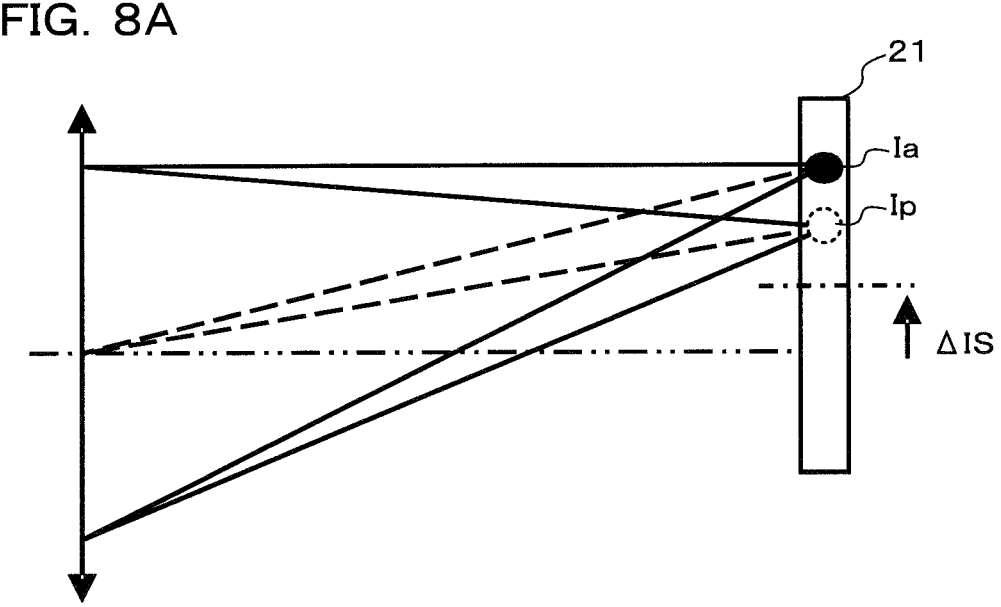
FIG. 8A and FIG. 8B are diagrams explaining the influence of an image height when an image sensor is moved by a camera-shake preventing section, in an embodiment of the present invention.
Figure 8B:
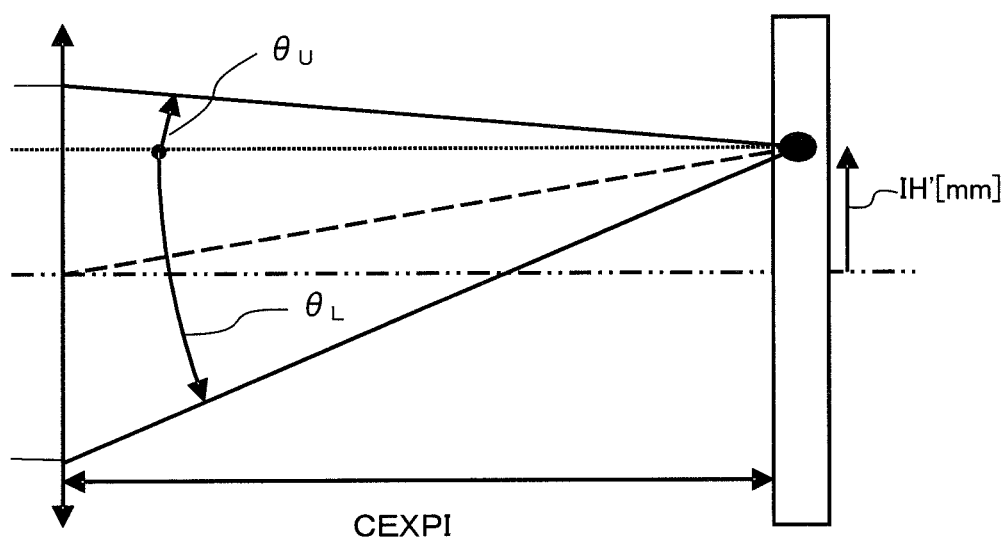

FIG. 8A and FIG. 8B are the diagrams explaining the influence on the image height of an image sensor by the camera-shake preventing mechanism. When the camera-shake preventing mechanism is in operation, the influence by the camera-shake preventing mechanism is equivalent to a change in the image height, when seen from an optical system. Therefore, the image height is calculated in consideration of the moved portion by the camera-shake preventing mechanism. FIG. 8A illustrates the state where the image sensor 21 has moved upwardly by ΔIS upon operation of the camera-shake preventing mechanism. At this time, the range-finding area moves from a range-finding area Ip before moving by ΔIS to a range-finding area Ia with reference to the position of the optical system.

For the image height correction when the camera-shake preventing mechanism is in operation, the movement amount ΔIS caused by the camera-shake preventing mechanism during range finding is obtained, and then, a range-finding image height (image height in the range-finding area) IH'[d] when the camera-shake preventing mechanism is driven is obtained from Formula (11) below using the movement amount ΔIS.

$$IH'=IH+\Delta IS \quad (11)$$

IH' obtained from Formula (11) above is used to obtain the corrected FNo (corrected F value, CF) and CEXPI.

$$f1(FNo, zoom, LD, IH) \rightarrow \text{Corrected } FNo(CF) \quad (12)$$

$$f2(FNo, zoom, LD, IH) \rightarrow CEXPI \quad (13)$$

Here, f1 and f2 respectively are the functions of the aperture value (FNo) of a photographic lens (photographic light flux), a focal length (zoom), a lens position (LD), and a range-finding image height (IH). Moreover, f1 and f2 involve the interpolation calculation of the data, such as the discrete FNo, zoom, and LD.

Once the corrected FNo (CF) and CEXPI at a range-finding image height are obtained, tangent of the angle of a light flux incident at the range-finding image height is obtained (refer to FIG. 8B). Note that "*" means multiplication.

Tangent $U_P$ of the upper-side light beam $U_P$=tan
$$\theta_U=1/(2*CF)-IH'/|CEXPI| \quad (14)$$

Tangent $L_O$ of the lower side light beam $L_O$=tan
$$\theta=-1/(2*CF)-IH'/|CEXPI| \quad (15)$$

Moreover, in the image sensor, because of the manufacturing process thereof, a relative positional shift occurs between a silicon layer having a photoelectric conversion function and a microlens array for efficiently collecting light into a pixel. This shift occurs with a different value for each individual image sensor, and the influence of the positional shift appears as if the whole oblique incidence characteristic of an image sensor laterally shifts. In the present embodiment, the positional shift of the micro lens of the image sensor is corrected. Δθ is the tangent of an angular shift of the oblique incidence characteristic caused by an image sensor manufacturing error and the like. In the present embodiment, correction is performed by using the value of the tangent of an angular shift of the oblique incidence characteristic as the value of each of the tangents of the upper-side light beam and lower-side light beam used in AF sensitivity calculation.

Tangent $U_P$ of the upper-side light beam $UP=U_P-\Delta\theta$ (16)

Tangent $L_O$ of the lower side light beam $L_O=L_O-\Delta\theta$ (17)

In the present embodiment, the AF sensitivity is obtained, with reference to tables of FIG. 9A and FIG. 9B, using the value of Up of the upper-side light beam and the value of $L_O$ of the lower-side light beam. In the present embodiment, there are 13 range-finding areas: 0 to 12 (unshaded range-finding area) in the first quadrant as illustrated in FIG. 9A. The AF sensitivity is obtained, using a table as illustrated in FIG. 9B for each range-finding area, from $U_P$ of the upper-side light beam and $L_O$ of the lower-side light beam. Moreover, for the second quadrant to the fourth quadrant (shaded range-finding areas of FIG. 9A), a table including the same designated numbers as the table used for the first quadrant is used.

Next, using FIG. 10 to FIG. 12, a case will be explained where an image sensor moves in the x direction and y direction and furthermore rotates about the center of the image sensor. The coordinates of a range-finding area of an image-plane phase difference AF are defined in a coordinate system with reference to an image sensor. On the other hand, the pupil data (FNO, CEXPI, etc.) of an optical system used in obtaining the range-finding parameters (AF sensitivity etc.) are defined in a coordinate system with reference to the optical axis position of a photographic lens. In accordance with a position adjusting amount (x, y, θ) of an image sensor, the coordinates of a range-finding area with reference to an image sensor are converted to the coordinates in a coordinate system (rotating coordinate system) obtained by rotating, by θ, the coordinate system with reference to the optical axis position, and optical data is referred.

Figure 10:
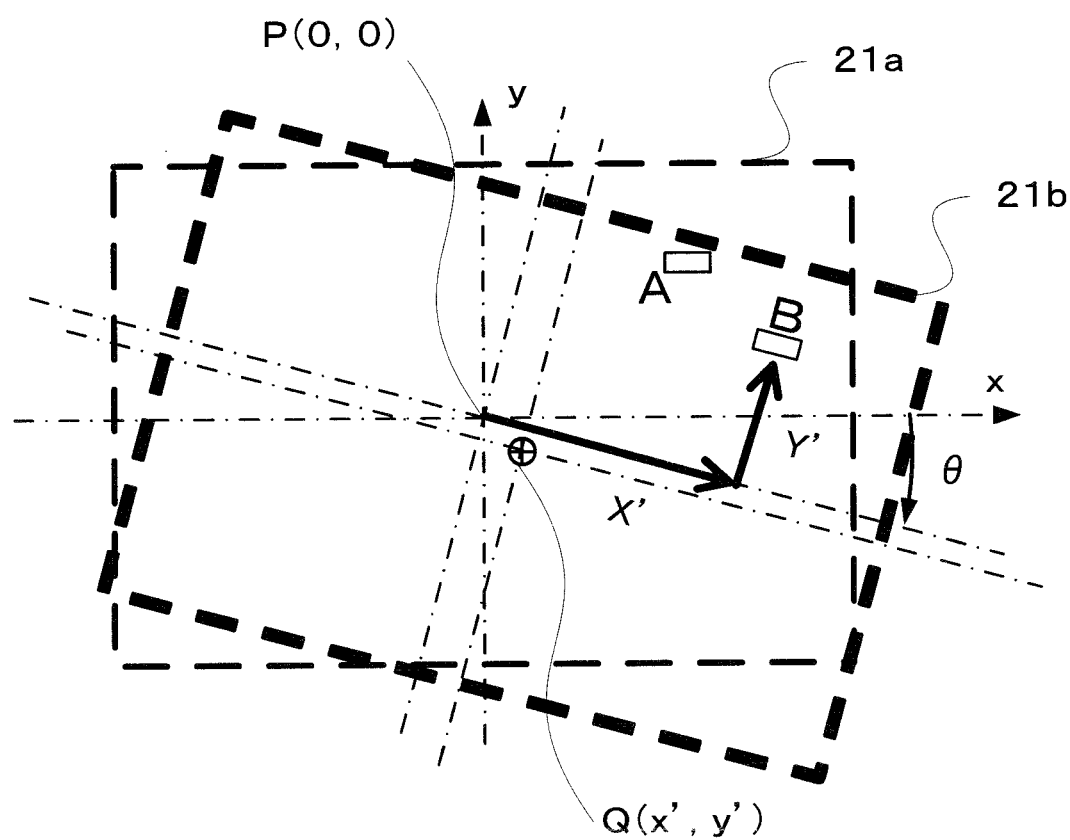
FIG. 10 is a diagram explaining the influence of an image height when the center position of an image sensor shifts and furthermore rotates, in an embodiment of the present invention.

FIG. 10 illustrates a positional relationship when the center of an image sensor moves, due to camera-shake correction, from the position of an optical-axis reference position P(0, 0) to the center Q(x, y) of the image sensor and furthermore rotates by a rotation angle θ. In FIG. 10, reference sign 21a denotes the imaging plane of the image sensor 21 before moving, while reference sign 21b denotes the imaging plane of the image sensor 21 after moving. Due to the camera-shake correction, the range-finding area A before moving will move from a position A to a position B. The movement amount (IS correction amount) due to such camera-shake correction of the image sensor 21 can be expressed by three components: (x, y, θ). When referring to the correction data for AF, based on the movement amount (x, y, θ), the coordinates of a range-finding area B with reference to the center Q of an image sensor are corrected to calculate and use the coordinates (X', Y') of after moving. Note that (X', Y') are the coordinates in the rotating coordinate system.

Figure 11A:
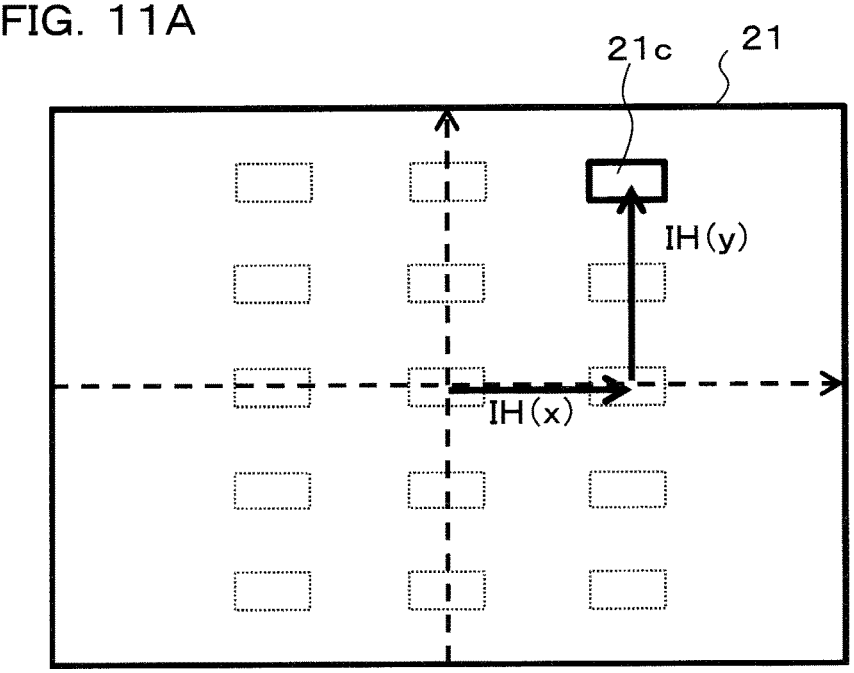
FIG. 11A and FIG. 11B are diagrams illustrating the coordinate position of a range-finding area and the movement of an image sensor in performing camera-shake correction, in an embodiment of the present invention.
Figure 11B:
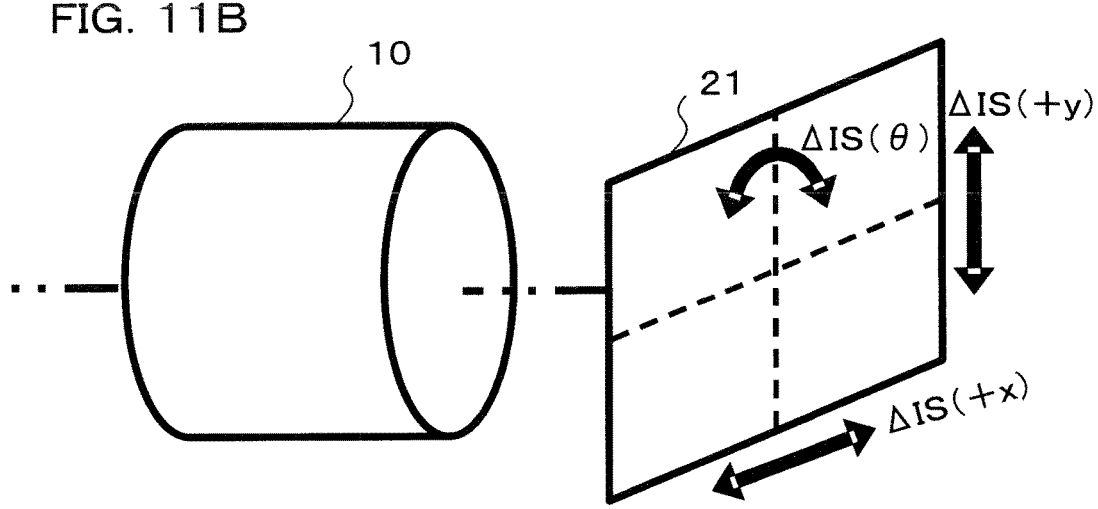

FIG. 11A illustrates the coordinates of a range-finding area, and FIG. 11B illustrates the movement of an image sensor due to camera-shake correction. In the example illustrated in FIG. 11A, there are provided a total of 15 range-finding areas: five in the vertical direction and three in the lateral direction, which are simplified from the arrangement of range-finding areas illustrated in FIG. 9A and FIG. 9B. Naturally, the arrangement of range-finding areas can be changed, as needed. In this example, now a range-finding area 21c at the position of IH(x) and IH(y) is selected. Note that IH(x) and IH(y) are collectively expressed by IH(x, y).

In performing the camera-shake correction, as illustrated in FIG. 11B, a lens section 10 is fixed, but the image sensor 21 moves in the x direction by ΔIS(x) and moves in the y direction by ΔIS(y), and then rotates about the center of the image sensor 21 by ΔIS(θ). Note that ΔIS(x) which is the x component of the movement amount ΔIS and ΔIS(y) which is the y component are collectively expressed by ΔIS(x, y).

Figure 12A:
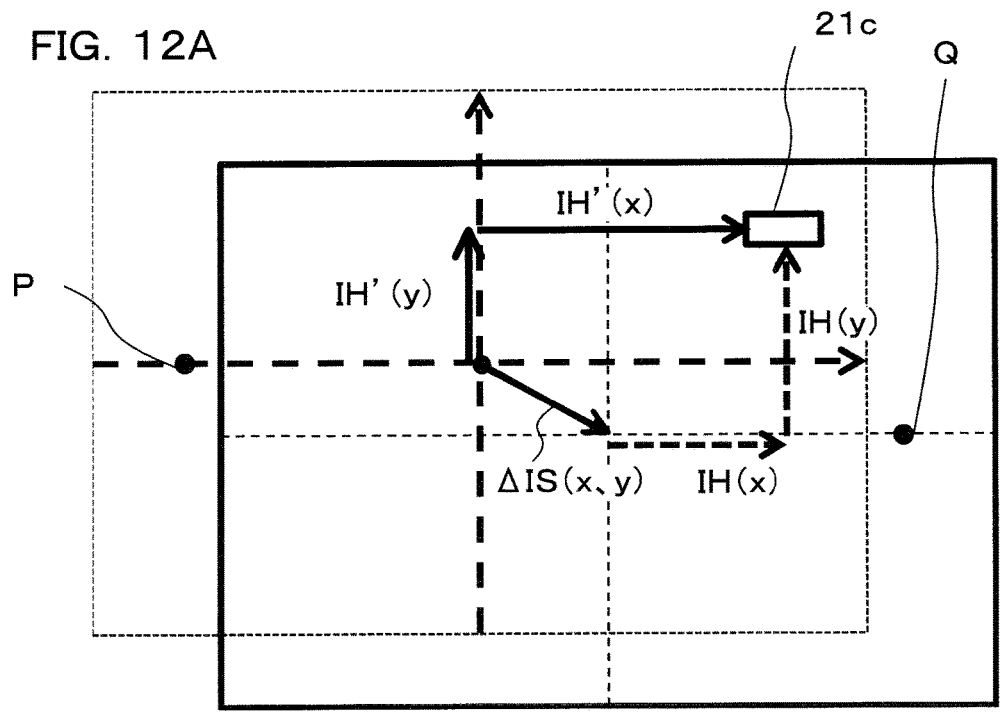
FIG. 12A and FIG. 12B are diagrams explaining the coordinate conversion in a case of not considering rotation and in a case of considering rotation, respectively, in an embodiment of the present invention.

Next, the coordinate conversion taking into consideration a camera-shake correction amount with reference to an image sensor will be explained using FIG. 12A and FIG. 12B. First, the coordinate conversion without taking rotation into consideration will be explained using FIG. 12A. In performing the image-plane phase difference AF, the information on the light flux incident on a range-finding area is needed. When the camera shake is corrected by moving the image sensor 21, the movement amount ΔIS(x, y) of the image sensor 21 which is a camera-shake correction amount is added to the coordinates IH(x, y) of the range-finding area 21c with reference to the center of the image sensor to obtain the coordinates IH'(x, y) with reference to the optical axis of the photographic lens. Then, in obtaining the light flux information on the range-finding area 21c, it is possible to obtain appropriate light flux information by using the coordinates IH'(x, y), even when the camera-shake preventing mechanism is in operation. Note that the x component of IH'(x, y) is expressed by IH'(x) and the y component by IH'(y).

When the rotation component θ is not taken into consideration, the above-described Formula (11) is transformed and IH'(x) and IH'(y) can be calculated from Formula (18) and Formula (19) below.

$$IH'(x)=IH(x)+\Delta IS(x) \quad (18)$$

$$IH'(y)=IH(y)+\Delta IS(y) \quad (19)$$

Next, the coordinates when the rotation is taken into consideration will be explained using FIG. 12B. When the camera-shake correction is performed by moving the image sensor 21, appropriate light flux information is obtained also in consideration of the rotation component (θ) of the image sensor 21.

Figure 12B:
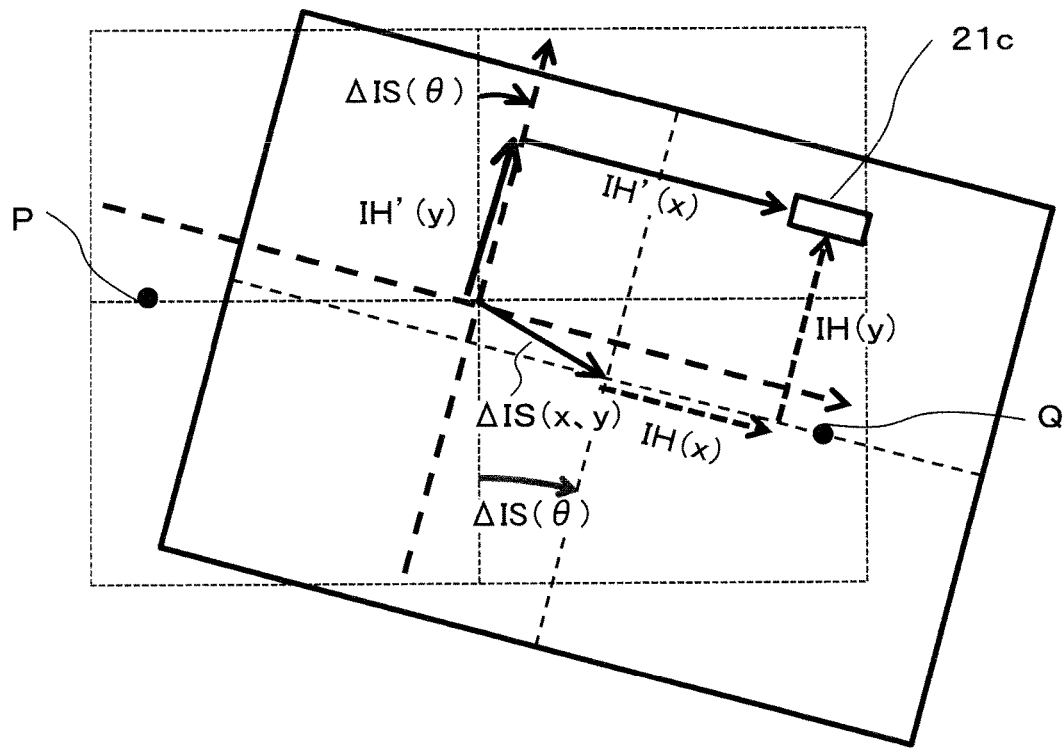

In the example illustrated in FIG. 12B, the correction amount of camera shake is ΔIS(x, y) plus ΔIS(θ) i.e., plus the rotation component (θ). In this case, IH'(x') and IH'(y') in a coordinate system (x', y') obtained by rotating the coordinate system (x, y) with reference to the optical axis of a photographic lens by a rotation component (θ) are calculated from Formula (20) and Formula (21) below.

Light flux information results in optically identical data at positions on the circumference having an identical radius about the optical axis of a photographic lens, in an image plane. Accordingly, it is possible to calculate a position (IH'(x'), IH'(y')) of the range-finding area 21c in a rotating coordinate system (x', y') with reference to the optical axis of a photographic lens and to apply the calculated IH'(x') and IH'(y'), as-is, to a non-rotating coordinate system (x, y) with reference to the optical axis of the photographic lens. That is, the light flux information may be obtained by applying, as the coordinates, the numerical values of IH'(x') and IH'(y') as-is in the non-rotating coordinate system with reference to the optical axis of the photographic lens.

Note that, because ΔIS(x, y) is the movement of an image sensor due to camera-shake correction, it is expressed in the non-rotating coordinate system (x, y) with reference to the optical axis of the photographic lens. Because the coordinates IH(x, y) expressing the position of a range-finding area moves and rotates along with an image sensor, the values thereof are used as-is. The process to calculate IH'(x') and IH'(y') in this manner is referred to as IS-portion image height correction.

$$IH'(x')=IH(x)+\cos(\theta)*\Delta IS(x)+\sin(\theta)*\Delta IS(y) \quad (20)$$

$$IH'(y')=IH(y)-\sin(\theta)*\Delta IS(x)+\cos(\theta)*\Delta IS(y) \quad (21)$$

As described above, the image height in a range-finding area is converted from an image height IH with reference to the center of an image sensor to an image height IH' with reference to an optical axis of a photographic optical system, to obtain light flux information, and thereby it becomes possible to perform calculation using an appropriate numerical value, even when the image sensor 21 rotates due to camera shake, thus enabling more accurate range finding. Moreover, as the image sensor 21 rotates, the pupil division direction of the image-plane phase difference AF similarly rotates. Because the calculation of AF is performed in accordance with the pupil division direction, the process in accordance with the calculation of AF can be easily performed using the coordinate axis in accordance with the rotated image sensor 21.

Figure 13:
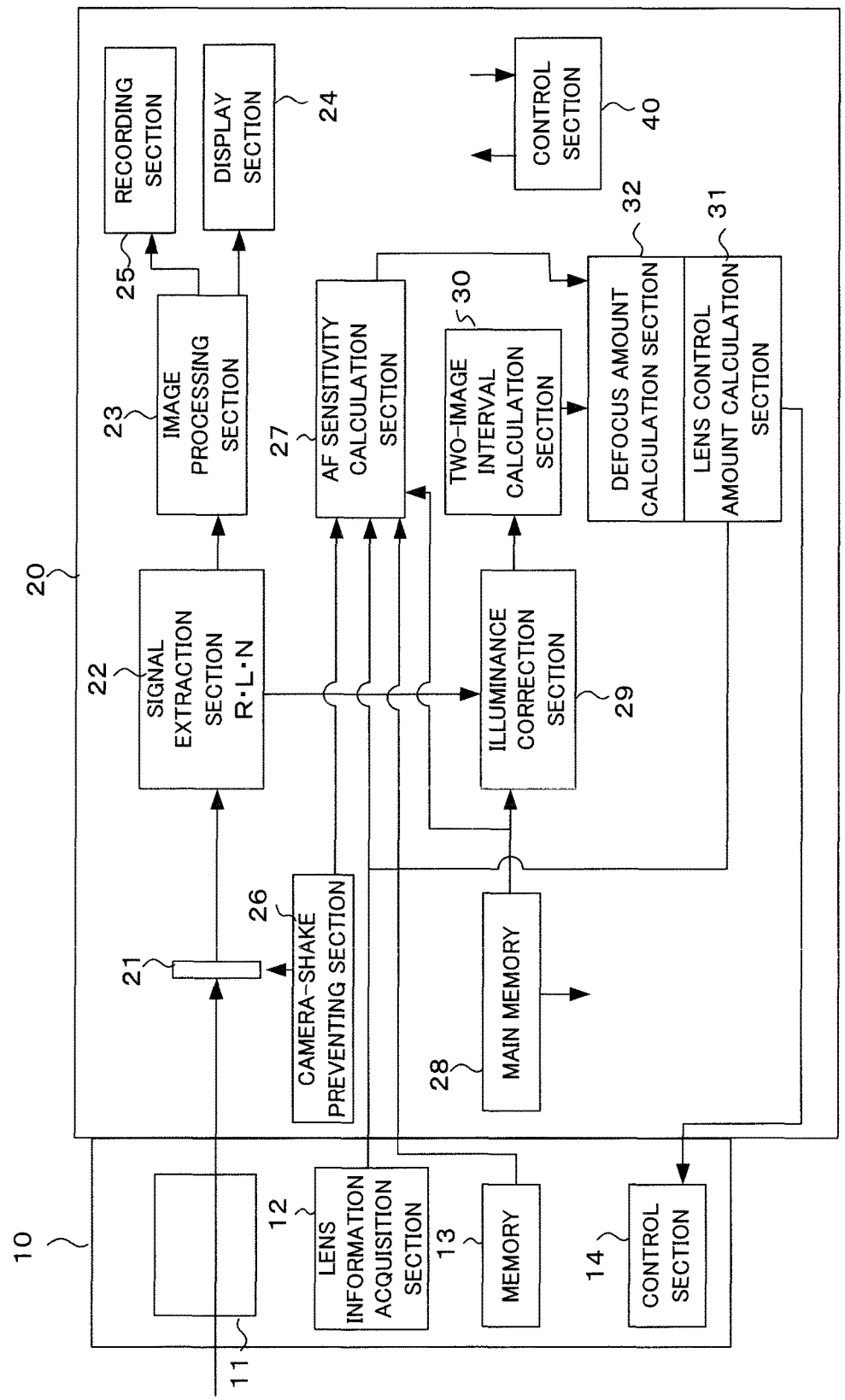
FIG. 13 is a block diagram mainly illustrating an electric configuration of a camera according to an embodiment of the present invention.

Next, the configuration in the present embodiment will be explained using FIG. 13. A camera according to the present embodiment comprises: a body section 20 including main circuits; and the lens section 10 attached to the housing of the body section 20. Note that the lens section 10 may be an interchangeable lens removably attached to the body section 20.

An optical system 11 which is a photographic lens, a lens information acquisition section 12, a memory 13, and a control section 14 are provided in the lens section 10. The optical system 11 is adapted to guide the optical image of a subject to the imaging plane of the image sensor 21 of the body section 20. The optical system 11 includes a non-illustrated optical lens, and has a focus drive function of performing focusing driven and controlled by the control section 14. Moreover, the optical system 11 may have a zoom function. Note that, as the lens section 10, the one having a single-focus photographic lens may be employed.

Moreover, the optical system 11 includes a non-illustrated aperture, and controls the transmitted light amount of the light flux of a subject passing through the optical system (photographic lens) by controlling the opening diameter of the aperture. Moreover, as the opening diameter of the aperture varies, the incident angle of the light flux of a subject also varies.

The lens information acquisition section 12 inside the lens section 10 includes a position detection sensor, a detection circuit, and the like to detect the lens information inside the lens section 10, e.g., the zoom position (Zmenc), focus position (subject distance, IO), and aperture value (FNo) of the optical system 11, and outputs the detected lens information to the body section 20.

The memory 13 inside the lens section 10 is an electrically-rewritable nonvolatile memory, such as a flash memory, and stores various kinds of information on the lens section 10, for example the aperture position, aperture diameter, exit pupil position, exit pupil diameter, focus lens position, and the information on vignetting and the like in accordance with the image height and direction. Moreover, the memory 13 stores, as the AF calculation parameters, the corrected F value (CF) in accordance with the state of a lens and the information on the corrected exit pupil position (CEXPI). The memory 13 functions as a memory which stores the information based on the output of a focal point detection pixel. The AF calculation parameters in the memory 13 are transmitted to the body section 20, so that the information on the AF sensitivity can be calculated in the body section 20.

The control section 14 includes a CPU and its peripheral circuit, and controls each section inside the lens section 10 in accordance with a program stored inside the memory 13 and in response to a control instruction of a control section 40 inside the body section 20. The control section 14 performs the communication with the body section 20, the focus lens control inside the optical system 11, the aperture control, and the like. The transmission of the lens information obtained by the lens information acquisition section 12, the transmission of the various kinds of information stored inside the memory 13, and the like are performed through the communication with the body section 20.

The body section 20 includes the image sensor 21, a signal extraction section 22, an image processing section 23, a display section 24, a recording section 25, a camera-shake preventing section 26, an AF sensitivity calculation section 27, a main memory 28, an illuminance correction section 29, a two-image interval calculation section 30, a lens control amount calculation section 31, and the control section 40.

The image sensor 21 is an image sensor, such as a CMOS image sensor or a CCD image sensor, and is arranged in a vicinity of the image forming position of a subject formed by the optical system 11. The image sensor 21 comprises the above-described imaging pixel, and L pixel and R pixel which are the focal point detection pixels. The image sensor 21 photoelectric-converts a subject image, and outputs the photoelectric-converted signal to the signal extraction section 22.

The signal extraction section 22 includes a signal extraction circuit, and extracts an image signal from the output of the image sensor 21 and outputs the same. Note that, this image signal includes not only an image signal based on the output of an imaging pixel N, but also an L image signal based on the output of the L pixel and an R image signal based on the output of the R pixel. The signal extraction section 22 outputs the captured image signal to the image processing section 23, and also outputs the L image signal and R image signal based on the outputs of the focal point detection pixels (L pixel, R pixel) to the illuminance correction section 29.

The image processing section 23 includes an image processing circuit, and performs predetermined signal processing, e.g., chrominance signal generation processing, matrix conversion processing, and various other types of signal processing on the image signal from the signal extraction section 22. The image processing section 23 outputs the processed image signal to the display section 24 to display a captured image. Moreover, the image processing section 23 applies an encoding process to the processed image signal and outputs the resulting compressed image information to the recording section 25 to record this image information.

The recording section 25 includes an electrically-rewritable nonvolatile memory. As the memory inside the recording section 25, a card interface can be employed, for example. The recording section 25 can record image information, audio information, and the like on a memory card or the like. Moreover, the recording section 25 can read the image information and audio information recorded on a recording medium, and supply them to the image processing section 23. The image processing section 23 can decode the image information and audio information from the recording section 25 to obtain an image signal and an audio signal.

The camera-shake preventing section 26 includes the well-known camera-shake preventing mechanism and the like. The camera-shake preventing section 26 detects, with a sensor such as a gyroscope, a movement such as camera shake applied to the body section 20, and drives the image sensor 21 in the plane perpendicular to the optical axis of the optical system 11 so as to cancel this movement (camera-shake preventing operation). Moreover, in performing the camera-shake preventing operation, the camera-shake preventing section 26 outputs the information (e.g., ΔIS of FIG. 8) on the movement amount of the image sensor 21 to the AF sensitivity calculation section 27.

The AF sensitivity calculation section 27 is used in obtaining the AF sensitivity for calculating a defocus amount, as described above. That is, if the AF sensitivity is designated by a and the two-image interval by "A", then the defocus amount Def can be expressed by Def=α×A. The AF sensitivity calculation section 27 receives a movement amount ΔIS of the image sensor 21 from the camera-shake preventing section 26, the lens information from the lens information acquisition section 12 inside the lens section 10, and the lens information (corrected F value (CF) and corrected exit pupil position (CEXPI)) from the memory 13. Moreover, it also receives, from the main memory 28, angular shift information (Aθ) of the oblique incidence characteristic obtained during manufacturing of the image sensor 21.

The AF sensitivity calculation section 27 calculates the angles $\theta_U$ and $\theta_L$ illustrated in FIG. 8B based on these pieces of information, and obtains the AF sensitivity with reference to the table illustrated in FIG. 9 using these calculated angles $\theta_U$ and $\theta_L$ ($U_F$, $L_O$).

The main memory 28 is an electrically-rewritable non-volatile memory, such as a flash memory, and stores the angular shift information (Δθ) of the oblique incidence characteristic obtained during manufacturing of the image sensor 21. Moreover, the main memory 28 stores the AF sensitivity for each $U_F$ in accordance with an emission angle $\theta_U$ of the upper-side light beam of the light flux toward a range-finding position and for each Lo in accordance with an emission angle $\theta_L$ of the lower-side light beam of the light flux toward a range-finding position as illustrated in FIG. 9B. Other than these pieces of information, the main memory stores various adjustment values inside the body section 20 and a program for controlling the control section 40 and the like. Note that, each information output to the AF sensitivity calculation section 27 from the lens section 10 may be stored into the main memory 28 once, and output to the AF sensitivity calculation section 27 as needed.

The illuminance correction section 29 receives the L image signal and R image signal from the signal extraction section 22 and the angular shift information of the oblique incidence characteristic from the main memory 28, and performs illuminance correction on the L image signal and R image signal using the angular shift information. The illuminance correction section 29 corrects, through this illuminance correction, an unbalance of the light receiving amount between the L image signal and the R image signal as illustrated in FIG. 7 due to a positional shift between the micro lens of the image sensor 21 and the focal point detection pixel.

The two-image interval calculation section 30 obtains, using the well-known calculation formula, a two-image interval from the L image signal and R image signal having been subjected to illuminance correction and outputs the two-image interval to a defocus amount calculation section 32.

The defocus amount calculation section 32 receives the AF sensitivity from the AF sensitivity calculation section 27 and also receives the two-image interval from the two-image interval calculation section 30, and calculates a defocus amount by multiplying the two-image interval by the AF sensitivity. In calculating this defocus amount, the defocus amount calculation section 32 corrects a distance d from the center of the optical axis of the image sensor 21 to a range-finding area. This correction calculation will be described later using #27 to #33 of FIG. 14B.

The lens control amount calculation section 31 calculates a lens control amount based on the defocus amount calculated by the defocus amount calculation section 32. As described above, because the information on the AF sensitivity depends on an image height, the lens control amount calculation section 31 can calculate the defocus amount with high precision even when a two-image interval has been obtained by using a focal point detection pixel outside the optical axis. Moreover, because the defocus amount is calculated in consideration of the movement of a range-finding area in the image sensor 21, the lens control amount calculation section 31 calculates the defocus amount and lens control amount accurately even when the screen center of an image sensor and the center of the optical axis of the optical system shift from each other. This calculated lens control amount is output to the control section 14 inside the lens section 10, and the control section 14 controls the optical system 11 based on this lens control amount to perform autofocusing adjustment control.

Note that, the above-described AF sensitivity calculation section 27, the illuminance correction section 29, the two-image interval calculation section 30, the lens control amount calculation section 31, and the defocus amount calculation section 32 each may be constituted by a hardware circuit etc., or may be implemented in software by a control circuit (controller, such as a CPU), such as the control section 40 to be described later.

The control section 40 controls each section of the body section 20. For example, the control section 40 detects a user's operation on various switches provided on the housing of the body section 20, e.g., a switch for setting a photographing mode, a release button to perform photographing, etc., and controls each section based on the user's operation.

Next, the processing flow for calculating the defocus amount will be explained using the processing flow diagrams illustrated in FIG. 14A and FIG. 14B. First, zoom position information (Zmenc) (#1a), subject distance information (IO) (#1b), and aperture value information (FNo) (#1c) are obtained from the lens information acquisition section 12 inside the lens section 10, and output to the AF sensitivity calculation section 27 of the body section 20 (#1).

Moreover, the camera-shake preventing section 26 inside the body section 20 obtains an IS drive amount $\Delta IS(x, y, \theta)$ (#5). That is, in performing the camera-shake preventing operation, the camera-shake preventing section 26 obtains the information ($\Delta IS(x, y)$, $\Delta IS(\theta)$ of FIG. 12B) on the movement amount of the image sensor 21. Moreover, the control section 40 obtains the coordinates IH(x), IH(y) of a range-finding area on the image sensor (#3). The range-finding area is determined based on the position of a face detected by the image processing section 23, a position which a photographer specifies with an operating member, etc.

The control section 40 performs the IS-portion image height correction using the coordinates IH of a range-finding area and the IS drive amount $\Delta IS$(#7). Here, according to the above-described Formula (20) and Formula (21), the image height is corrected in consideration of the x direction, y direction, and rotation amount $\theta$. That is, because an area on the image sensor 21 corresponding to the determined range-finding area moves due to the camera-shake preventing operation, an optical position of the destination is calculated and output to the AF sensitivity calculation section 27.

The memory 13 inside the lens section 10 stores the corrected F value (CF) and exit pupil position (CEXPI) corresponding to a lens state (#9), and these data are read and output to the AF sensitivity calculation section 27 of the body section 20.

The AF sensitivity calculation section 27 receives the lens information from the lens section 10 obtained in #1, the IS-portion image height correction value calculated in #7, and the data stored in the memory 13, and performs the interpolation calculation of the FNo and the CEXPI values (#11). Here, based on the zoom position, subject distance, and aperture value obtained in #1 and the image height calculated in #7, CF and CEXPI used for calculation are obtained using the data of the corrected F value (CF) and corrected exit pupil position (CEXPI) stored in the memory 13. Note that, because the pieces of data stored in the memory 13 are discrete, they will be interpolated. Then, based on Formulae (14) and (15), the emission angle $\theta_U$ of the upper-side light beam and the emission angle $\theta_L$ of the lower-side light beam of the light flux toward the range-finding position illustrated in FIG. 6B and FIG. 8B are calculated (tan $\theta_U$ and tan $\theta_L$ may be calculated).

Because the main memory 28 inside the body section 20 stores the angular shift information ($\Delta\theta$) of the oblique incidence characteristic obtained during manufacturing of the image sensor 21, the AF sensitivity calculation section 27 calculates $\theta_U+\Delta\theta$ and $\theta_L+\Delta\theta$ using this angular shift information $\Delta\theta$ (#15).

Upon receipt of the emission angle $\theta_U+\Delta\theta$ of the upper-side light beam and emission angle $\theta_L+\Delta\theta$ of the lower-side light beam of the light flux toward the corrected range-finding position, the AF sensitivity calculation section 27 obtains, using these angles, an AF sensitivity (def_el) with reference to the table stored in the main memory 28 (#13).

The pixel values of the R pixel and L pixel from the signal extraction section 22 (#17) and the angular shift information of the oblique incidence characteristic of an image sensor (#15) are output to the illuminance correction section 29, and illuminance correction is performed (#19). Here, a light quantity difference between the right opening and left opening of the focal point detection pixel (AF pixel) is corrected using the angular shift information.

The pixel values of the focal point detection pixel having been subjected to illuminance correction are output to the two-image interval calculation section 30, and two-image interval calculation is performed (#21). Here, a two-image interval (EL) between an R pixel array and an L pixel array is calculated using the known phase-difference AF.

Upon receipt of the two-image interval (EL) calculated in #21 and the AF sensitivity def_el calculated in #13, the lens control amount calculation section 31 performs defocus calculation (#23). Here, the lens control amount calculation section 31 selects an AF sensitivity (ZAFK) of a range-finding area corresponding to the two-image interval value (EL), and multiplies the EL value by this AF sensitivity to obtain the defocus amount. Note that, in an identical area, the same coefficient is selected even if a plurality of blocks into which an area is divided is separated from each other. The defocus value can be obtained by this calculation (#25). This calculated defocus value is subjected to the correction associated with the movement of a range-finding area in #33.

The correction of the defocus value is performed in #27 to #33. First, interpolation of focus sensitivities FR_M, FR_S is performed (#29). The focus sensitivity indicates a ratio between an image plane movement amount at a predetermined image height position and a unit image plane movement amount on the optical axis of the photographic lens, and is one format of the correction value for correcting the defocus amount. Here, FR_M denotes a focus sensitivity in a meridional plane while FR_S denotes a focus sensitivity in a sagittal plane. That is, these sensitivities FR_M and FR_S denote the correction values for performing the correction depending on an optical aberration of the photographic lens 11 for the defocus value calculated in #25.

The focus sensitivities FR_M and FR_S are stored, as a focus sensitivity table #27, in the memory 13 inside an interchangeable lens barrel 10. The focus sensitivity FR_M and focus sensitivity FR_S stored in this focus sensitivity table #27 are stored in a table form corresponding to a representative point Obj of the focus lens position, a representative point Zn of the zoom position, a distance x (in the X direction) from the center of the optical axis of a range-finding area, and a distance y (in the Y direction) from the center of the optical axis of a range-finding area.

The representative point Obj of the focus lens position corresponds to the position of a focus lens 11a, the representative point Zn of the zoom position corresponds to the position of a zoom lens 11b, and the distances x and y correspond to the coordinates (x, y) of the center point in each of the range-finding areas. The focus sensitivities change with the optical aberration of the photographic lens 11, and change with the positions of the focus lens and zoom lens inside the photographic lens 11 and the position of the range-finding area on the plane of the image sensor 21. The sensitivity table #27 stored in the memory 13 stores the focus sensitivities FR_M and FR_S corresponding to the representative values on the basis of the balance with a memory capacity.

In #29, interpolation calculation is performed on the focus sensitivities FR_M and FR_S. That is, the subject distance IO (#1b), the zoom position Zmenc (#1a), and the IS image height correction value (IH'(x'), IH'(y')) (#7) are input, and the sensitivities FR_M=F (IO, Zmenc, IH'(x')) and FR_S= (IO, Zmenc, IH'(y')) are obtained accurately by the interpolation calculation using these values and the representative values stored in the focus sensitivity table #27. Here, the subject distance IO (#1b) and the zoom position Zmenc (#1a) are detected by the lens information acquisition section 12 inside the lens section 10, and this detection result is transmitted to the lens control amount calculation section 31. Moreover, the IS image height correction value (IH'(x'), IH'(y')) (#7) is the result of the correction of an image height performed by the control section 40 in consideration of the x direction, y direction, and rotation amount θ according to the above-described Formula (20) and Formula (21) using the coordinate IH of a range-finding area and the IS drive amount ΔIS.

Figure 16A:
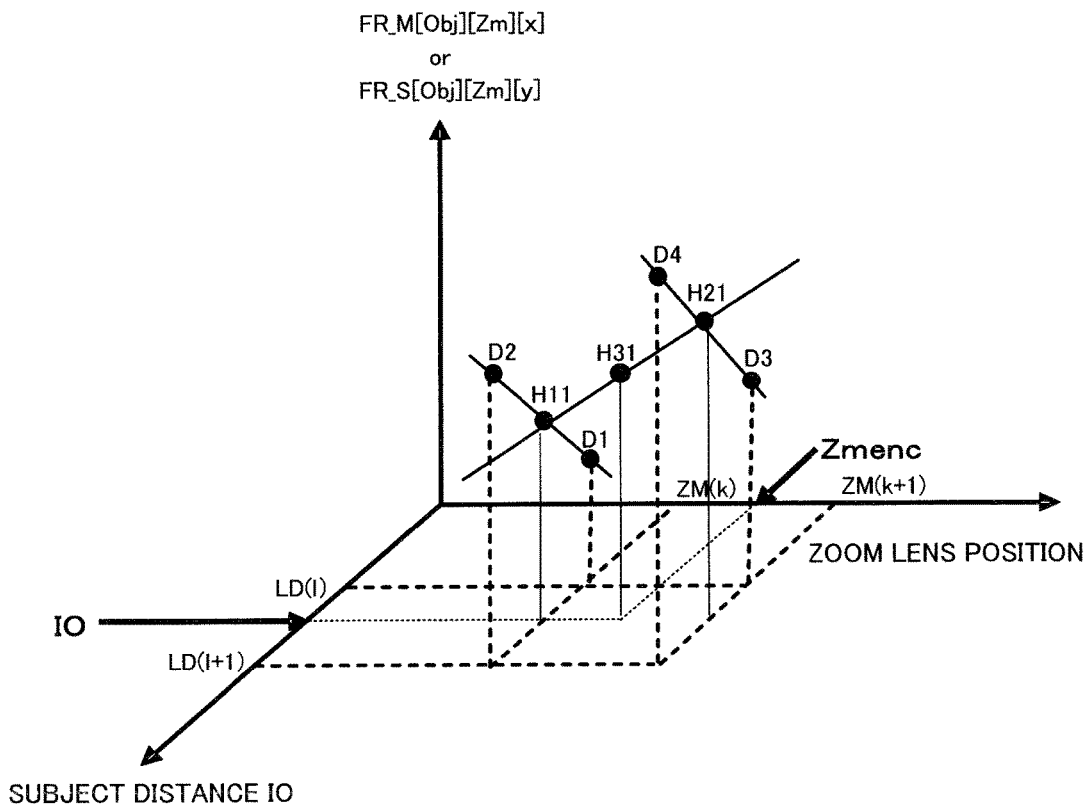
FIG. 16A and FIG. 16B are diagrams explaining a correction sensitivity approximate function in a camera according to an embodiment of the present invention.

The interpolation calculation for the focus sensitivities FR_M and FR_S in #29 will be explained using FIG. 16. In FIG. 16A, the x-axis represents the zoom lens position, the y-axis represents the subject distance, and the z-axis represents the focus sensitivities FR_M and FR_S corresponding to these positions. As described above, the focus sensitivity table #27 stores only the focus sensitivities corresponding to the representative points, and in an example illustrated in FIG. 16A, the focus sensitivity table #27 stores a focus sensitivity D1 corresponding to LD(i) and ZM(k), a focus sensitivity D2 corresponding to LD(i+1) and ZM(k), a focus sensitivity D3 corresponding to LD(i) and ZM(k+1), and a focus sensitivity D4 corresponding to LD(i+1) and ZM(k+1) as the focus sensitivity FR_M or FR_S.

Since the focus sensitivity FR_M or FR_S directly corresponding to the subject distance IO and the zoom position Zmenc illustrated in FIG. 16A does not exist, the focus sensitivity is obtained by interpolation. First, a focus sensitivity H11 is calculated by the interpolation of the focus sensitivities D1 and D2, and a focus sensitivity H21 is calculated by the interpolation of the focus sensitivities D3 and D4. Then, a focus sensitivity H31 is calculated by the interpolation of the calculated focus sensitivities H11 and H21. This focus sensitivity H31 is a focus sensitivity which corresponds to the subject distance IO corresponding to this coordinate position (image height position) x and corresponds to the zoom position Zmenc.

Figure 16B:
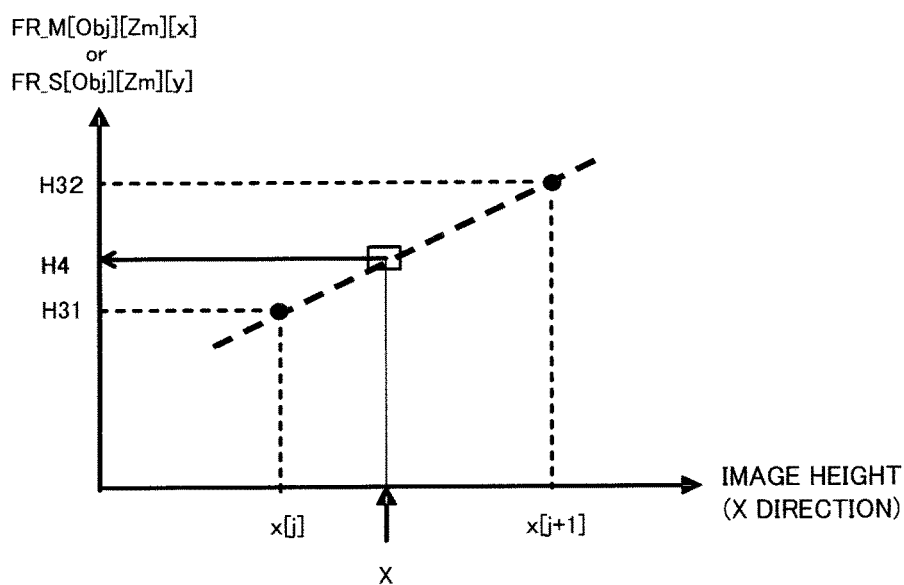

Once the focus sensitivities at the image height positions (x, y) of a plurality of predetermined range-finding areas corresponding to the subject distance IO and zoom position Zmenc are obtained, and then these focus sensitivities are further converted to the focus sensitivities in consideration of an image height (x, y) corresponding to the range-finding position at which range-finding is actually performed. FIG. 16B illustrates the image height (X direction) expressed in the horizontal axis and the focus sensitivity FR_M expressed in the vertical axis. Note that the graph illustrating the image height (Y direction) in the horizontal axis and the focus sensitivity FR_S in the vertical axis is similar to that of FIG. 16B and is therefore omitted.

In the example illustrated in FIG. 16A, the focus sensitivity H31 is obtained by the interpolation, while FIG. 16B illustrates the case of an image height x[j]. The focus sensitivity table #27 of the memory 13 stores a table corresponding to an image height x[j+1]. A focus sensitivity H32 in the case of the image height x[j+1] is calculated by interpolation similar to that of FIG. 16A.

Using a point determined by the image height x[j] and the sensitivity H31 and a point determined by the image height x[j+1] and the focus sensitivity H32, a focus sensitivity H4 at an image height x in a range-finding area is calculated by interpolation. This focus sensitivity H4 is the focus sensitivity FR_M calculated in #29. Further, similarly using the image height x[j], image height x[j], and focus sensitivities thereof, a focus sensitivity at an image height y in a range-finding area is calculated by interpolation. This focus sensitivity is the focus sensitivity FR_S calculated in #29. In this manner, the focus sensitivities FR_M and FR_S corresponding to coordinates (x, y) of a range-finding area are calculated, respectively.

Using the above calculation method, in #29 the IS-portion image height correction IH'(x'), IH'(y') calculated in #7 based on a movement amount (also called imager shift amount) ΔIS(x, y, θ) (#5) of the image sensor 21 for the purpose of camera-shake correction is input from the camera-shake preventing section 26, and the focus sensitivities FR_M and FR_S are obtained by interpolation in consideration of the movement amount of the image sensor 21. That is, from the focus sensitivities FR_M and FR_S at the image height (x, y) determined by a range-finding area, the focus sensitivity at the coordinates (image height position) (IH'(x), IH'(y)) added with the movement amount of the image sensor 21 due to the camera-shake correction are calculated by interpolation with the method explained using FIG. 16B. The focus sensitivity FR_M at the coordinate (image height position) IH'(x) is calculated by linearly interpolating the focus sensitivities FR_M at two coordinate positions on both sides in the x-axis direction of the coordinate (image height position) IH'(x). Moreover, the focus sensitivity FR_S at the coordinate (image height position) IH'(y) is calculated by linearly interpolating the focus sensitivities FR_S at two coordinate positions on both sides in the y-axis direction of the coordinate (image height position) IH'(y).

Once the focus sensitivities FR_M and FR_S in consideration of the coordinates (image height position) IH'(x') and IH'(y') added with the movement amount of the image sensor 21 are calculated by interpolation, then focus sensitivity calculation is performed (#31). That is, the final focus sensitivity FR is calculated from Formula (22) below. The focus sensitivity FR is calculated by weighted-averaging the focus sensitivities FR_M and FR_S.

$$FR = [\{A \times FR\_S\} + \{B \times FR\_M\}]/(A+B) \qquad (22)$$

Once the focus sensitivity calculation is performed in #31, then a defocus amount in consideration of the focus sensitivity is calculated (#33). In this step, a defocus amount is calculated by dividing the defocus amount (defocus_dat) calculated in #31 (see FIG. 14A) by the focus sensitivity FR calculated in #31. That is, the defocus amount is calculated by Formula (23) below.

$$\text{defocus\_dat} = \text{defocus\_dat}/FR \qquad (23)$$

The defocus amount defocus_dat calculated by the above Formula (23) takes the imager shift amount (Xs, Ys) into consideration in addition to the focus lens position dst, the zoom position zm, and the image height (x, y). Therefore, even when the camera-shake preventing mechanism is operated for preventing the camera shake, it is possible to remove the influence of the optical aberration of the photographic lens 11 and to perform highly accurate focal point adjustment.

Once the defocus amount is calculated in #33, the correction of the range-finding calculation result is complete.

As described above, in the present embodiment, a correction value for correcting the information based on the output of a focal point detection pixel depending on an image height position is stored in the main memory 28, and the information based on the output of the focal point detection pixel is corrected depending on the output of the main memory 28, the output (see #5) of the camera-shake preventing section 26, and the position of a focal point detection pixel (see the AF sensitivity calculation section 27, #11, #13, and #23). Therefore, for example, even when the image sensor 21 moves in the plane perpendicular to the optical system 11 due to the camera-shake preventing operation, it is possible to correct the information (AF sensitivity) in accordance with this image height and to obtain an accurate defocus amount.

Moreover, in the present embodiment, the memory 13 inside the lens section 10 stores the information on the incident angle and angular range of a light flux incident on a focal point detection pixel, while the main memory 28 inside the body section 20 stores the information on characteristics of the focal point detection pixel. Therefore, even if the information on the lens section 10 side and the information on the body section 20 side are intricately intertwined with each other in calculating the information (defocus amount) for the focal point adjustment, each information can be separately processed, and therefore an accurate defocus amount can be obtained.

Moreover, the present embodiment includes the camera-shake preventing section 26 which moves the image sensor 21 in a direction perpendicular to the optical axis of the photographic lens 11 to correct camera shake and also outputs information (imager shift amount) on the movement, and the AF sensitivity calculation section 27 which calculates a focal point adjustment signal (defocus amount etc.) based on the output of the focal point detection pixel inside the image sensor 21, and corrects the focal point adjustment signal using the information (imager shift amount) on the movement (e.g., see #31 of FIG. 14B). Therefore, even when the screen center of an image sensor and the center of the optical axis of an optical system shift from each other, the defocus amount can be corrected accurately.

Note that, in the present embodiment, the influence of the position (x, y) on the image sensor 21 is taken into consideration in step #29, and the influence of the position (Xs, Ys) due to imager shift is taken into consideration in step #31. That is, the influence of the position is removed in two steps. However, since the both steps remove the influence of the position on the image sensor 21, the influences of the position may be removed in one step. That is, when the interpolation processing of the FR_M and FR_S in #29 is performed, the interpolation processing including the image height (x, y) and the imager shift amount (Xs, Ys) may be performed.

Further, while in Formula (23) for calculating a defocus amount as described above, the defocus amount is divided by a focus sensitivity FR, another function formula, such as a formula for multiplying the defocus amount by the focus sensitivity FR may be used depending on the generation method of the focus sensitivity FR (correction value)

Figure 15:
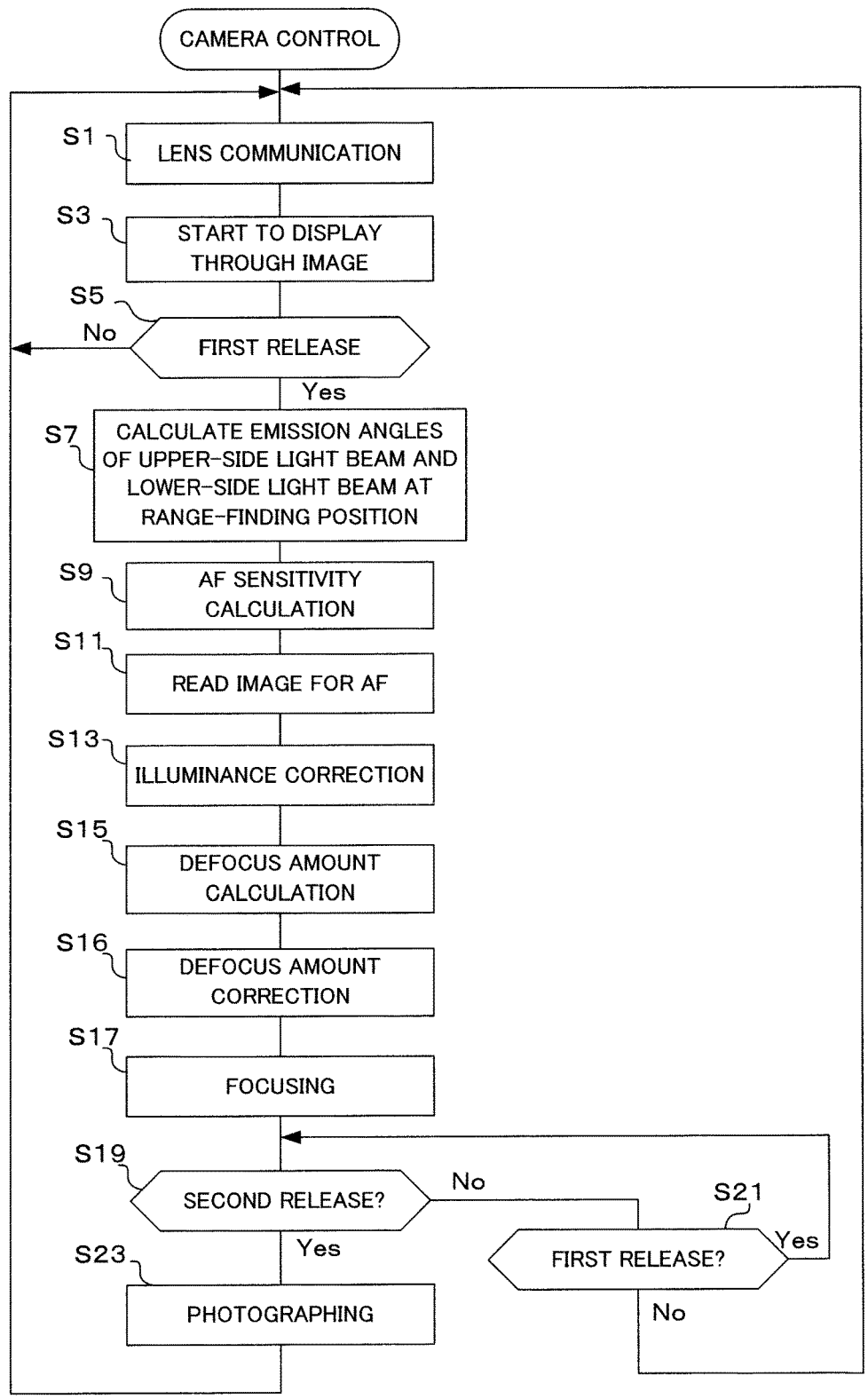
FIG. 15 is a flow chart illustrating the operation of the camera according to an embodiment of the present invention.

Next, the control of the whole camera in the present embodiment will be explained using the flow chart illustrated in FIG. 15. This flow is executed by the control section 40 which controls the control section 14 inside the lens section 10 and each section inside the body section 20 in accordance with programs stored in the main memory 28.

Once the camera is powered on, the control section 40 performs lens communication (S1). Here, lens information is obtained from the lens information acquisition section 12 and lens information (corrected F value (CF) and corrected exit pupil position (CEXPI)) are obtained from the memory 13. Note that the lens communication is performed between the control section 40 and the control section 14 periodically or as needed in a step other than this step.

Once the lens communication is performed, then a through image is displayed (S3). A captured image (through image) is displayed on the display section 24 based on an image signal from the image sensor 21.

Once the through image is displayed, then it is determined whether or not the first release is performed (S5). Here, the control section 40 determines this based on the state of a first release switch interlocking with half pressing of a release button. If the result of this determination indicates that the first release has not been performed, the flow returns to step S1.

If the result of the determination in step S5 indicates that the first release has been performed, the emission angles of the upper-side light beam and lower-side light beam of the light flux at a range-finding position are calculated (S7). Here, the AF sensitivity calculation section 27 obtains CF and CEXPI using the zoom position, subject distance, aperture, IS-portion image height correction, and the data from the memory 13, and calculates, from these values, the emission angle $\theta_U + \Delta\theta$ of the upper-side light beam and the emission angle $\theta_L + \Delta\theta$ of the lower-side light beam of the light flux toward the range-finding position (see #11 of FIG. 14A).

Once the emission angles are calculated, then the AF sensitivity is calculated (S9). Here, the AF sensitivity calculation section 27 obtains the AF sensitivity using the emission angle $\theta_U + \Delta\theta$ of the upper-side light beam and the emission angle $\theta_L + \Delta\theta$ of the lower-side light beam of a light flux toward the corrected range-finding position obtained in step S7, with reference to the table (e.g., FIG. 9B) stored in the main memory 28 (see #13 of FIG. 14A).

Once the AF sensitivity is calculated, then an image for AF is read (S11). Here, the pixel values of focal point detection pixels (R pixel and L pixel) are read by the signal extraction section 22 from among the pixel values read from the image sensor 21.

Once the image for AF is read, then illuminance correction is performed (S13). Here, the illuminance correction is performed on the focal point detection pixel value read in step S11, using the angular shift information of the oblique incidence characteristic obtained during manufacturing of the image sensor 21, the angular shift information being stored in the main memory 28 (see #19 of FIG. 14A).

Once the illuminance correction is performed, then the defocus amount calculation is performed (S15). Here, the two-image interval calculation section 30 calculates a two-image interval between the L pixel value and the R pixel value using the focal point detection pixel value having been subjected to the illuminance correction. The defocus amount calculation section 32 calculates a defocus amount using this calculated two-image interval and the AF sensitivity calculated by the AF sensitivity calculation section 27 (see #23 of FIG. 14A).

Once the defocus amount is calculated, then the defocus amount is corrected (S16). Here, the correction processing as explained in FIG. 14B is performed, considering that a range-finding area has moved due to the camera-shake preventing operation.

Once the defocus amount is corrected, then the focus adjustment is performed (S17). Here, the defocus amount calculated in step S15 is transmitted to the control section 14 inside the lens section 10, and the control section 14 drives and controls the focus lens so as to reach a focusing position, based on the defocus amount.

Once the focus adjustment is performed, then it is determined whether or not the second release is performed (S19). Here, the control section 40 determines this based on the state of a second release switch interlocking with full-pressing of the release button.

If the result of the determination in step S19 indicates that the second release is not performed, it is determined whether or not the first release is performed (S21), as in step S5. If the first release is performed, the determinations in steps S19 and S21 are repeated. On the other hand, if the first release is not performed, this is the state where a finger has separated from the release button and the half pressing of the release button has been released, and the flow returns to step S1.

On the other hand, if the result of the determination in step S19 indicates that the second release is performed, photographing is performed (S23). At the point of photographing, the focus adjustment operation is complete using the AF sensitivity corrected depending on the image height, and a subject is in focus. Once photographing is started, the image sensor 21 is exposed during a shutter time, and once the shutter time has elapsed, a pixel value is read from the image sensor 21, and the pixel value of an imaging pixel is extracted by the signal extraction section 22. This extracted pixel value is subjected to image processing by the image processing section 23, and is then recorded on the recording section 25. Once photographing is complete, the flow returns to step S1.

As described above, one embodiment of the present invention includes: the image sensor 21 having an imaging pixel which receives a light flux having passed through a photographic lens (optical system 11), performs photoelectric conversion, and outputs an image signal and a focal point detection pixel; the camera-shake preventing section 26 which moves the image sensor 21 in a direction perpendicular to the optical axis of the photographic lens (optical system 11) to correct camera shake and also outputs information on the movement; a storage section (e.g., memory 13, main memory 28) which stores a correction value for correcting the information based on the output of the focal point detection pixel depending on the image height position; and a correction section (e.g., AF sensitivity calculation section 27) which corrects the information based on the output of the focal point detection pixel in accordance with the output of the storage section, the output of the camera-shake preventing section, and the position of the focal point detection pixel. Therefore, even if the image sensor 21 is moved by the camera-shake preventing section 26, the focal point adjustment without the influence of an image height can be performed. In particular, even when the image sensor 21 rotates, it is possible to remove the influence of an image height and perform highly accurate focal point adjustment.

Figure 14A:
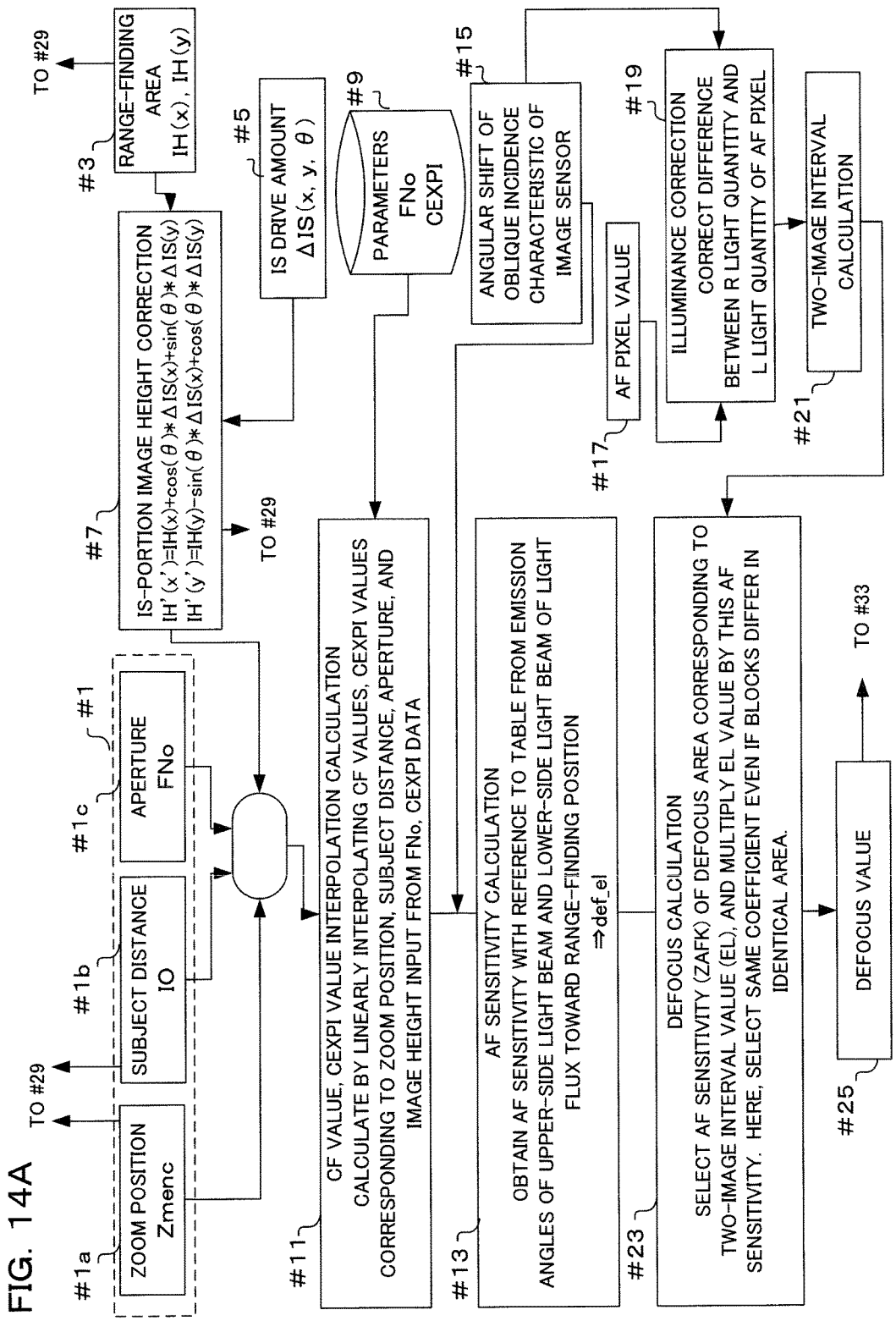

Moreover, in an embodiment of the present invention, the calculation section (e.g., AF sensitivity calculation section 27) uses the rotation angle information output by the camera-shake preventing section for the purpose of correcting the image height information on a range-finding position (e.g., see FIG. 12B, and #7 of FIG. 14A). Therefore, even when the image sensor 21 rotates, it is possible to correct image height information and perform highly accurate focal point adjustment. Moreover, for the corrected image height information used by the calculation section, a coordinate system which is rotated in accordance with the image sensor is used. Since the coordinate system in accordance with an image sensor is used, calculation can be simplified.

Moreover, in an embodiment of the present invention, the correction value is for correcting the conversion coefficient for converting a phase difference amount calculated based on the output of a focal point detection pixel to a defocus amount. For example, the AF sensitivity calculation section 27 corrects this conversion coefficient.

Moreover, in an embodiment of the present invention, the correction value is for correcting the nonuniformity of an illuminance distribution about the outputs of focal point detection pixels, the nonuniformity being caused by the incident light to a focal point detection pixel (see memory 13 and main memory 28). For example, the memory 13 stores the information on the corrected F value (CF) and corrected exit pupil position (CEXPI) corrected in accordance with an image height. Moreover, the main memory 28 stores the angular shift information (As) of the oblique incidence obtained during manufacturing of the image sensor 21, and can correct, based on this angular shift information, the nonuniformity of the illuminance distribution caused by the incident light to a focal point detection pixel.

Moreover, an embodiment of the present invention includes: a first storage section (e.g., memory 13) which stores the information on the incident angle and angular range of a light flux incident on a focal point detection pixel; a second storage section (e.g., main memory 28) which stores the information on characteristics of a focal point detection pixel; and a calculation section (e.g., AF sensitivity calculation section 27) which calculates the information for focal point adjustment based on the output of the first storage section, the output of the second storage section, and the output of the camera-shake preventing section 26. The first storage section stores the information related to an optical system, while the second storage section stores the information related to a focal point detecting element. Therefore, even when a combination of an optical system and a focal point detection element is changed, it is possible to remove the influence of an image height and to accurately obtain the information for focal point adjustment.

Moreover, an embodiment of the present invention includes: an interchangeable lens (lens section 10) including a photographic lens; and a camera body (body section 20) to and from which the interchangeable lens can be attached and detached and which has an image sensor. A first storage section (e.g., memory 13) is provided in the interchangeable lens while a second storage section (e.g., main memory 28)

is provided in the camera body. Therefore, even when a different interchangeable lens is mounted, it is possible to remove the influence of an image height and to accurately obtain the information for focal point adjustment.

Moreover, in an embodiment of the present invention, a first storage section (e.g., memory 13) stores the information on an incident angle and an angular range in association with the optical state of an interchangeable lens. For example, the tables illustrated in FIG. 9B and FIG. 13, the tables being stored in the memory 13, are stored in association with the value of $U_P$ of the upper-side light beam and the value of $L_O$ of the lower-side light beam. Therefore, an influence of an image height caused by a change in the optical conditions on the lens section 10 side can be removed.

Moreover, in an embodiment of the present invention, the second storage section stores the information on characteristics of a focal point detection pixel depending on the image height. For example, the main memory 28 stores the angular shift information of the oblique incidence obtained during manufacturing of the image sensor 21 depending on the image height. Therefore, the influence of an image height due to the image sensor 21 on the body section 20 side can be removed.

Moreover, an embodiment of the present invention includes: the image sensor 21 having an imaging pixel which receives a light flux having passed through the photographic lens 11, performs photoelectric conversion, and outputs an image signal, and a focal point detection pixel; the camera-shake preventing section 26 which moves the image sensor in a direction perpendicular to the optical axis of the photographic lens to correct camera shake and also outputs information on the movement; an AF calculation section which calculates a focal point adjustment signal based on an output of the focal point detection pixel; the memory 13 which stores a correction value for correcting a focal point adjustment signal depending on an image height position of a focal point detection pixel; and a correction section (lens control amount calculation section 31) which corrects a focal point adjustment signal in accordance with the output of the memory 13, the information output by the camera-shake preventing section 26, and the position of the focal point detection pixel. As described above, a focal point adjustment signal is corrected using the information on the movement in moving the image sensor 21 in order to correct the camera shake. Therefore, even when the screen center of an image sensor and the center of the optical axis of an optical system shift from each other, the defocus amount can be corrected accurately.

Note that, in one embodiment of the present invention, the upper-side light beam and lower-side light beam of a light flux incident at a range-finding position are expressed by the tangents $U_P$ and Lo corresponding to an angle, but naturally it may be detected as the angle itself, and obtained from a table thereof.

In calculating the AF sensitivity, the aperture value FNo and CEXPI are obtained by interpolation calculation based on the zoom position, the subject distance, the aperture, and the IS-portion image height correction value, $U_P$ and $L_O$ are obtained from this, the oblique incidence characteristic angular shift information on an image sensor is input, and the AF sensitivity is obtained from this information with reference to a table. However, other than this procedure, the above steps may be switched, as needed. The AF sensitivity calculation section 27 may two-dimensionally integrate in X and Y directions a region corresponding to the hatched portion which is a range of light flux incident angles on the light receiving sensitivity characteristics of a focal point detection pixel as illustrated in FIG. 7 to obtain the gravity center angle thereof, and calculate the AF sensitivity from an gravity center angular interval related to the paired L and R focal point detection pixels. Moreover, the coordinate information of a selected range-finding area (FIG. 9A) among a plurality of range-finding areas may be corrected with the displacement amount of the image sensor 21 caused by the camera-shake preventing section 26, and the AF sensitivity may be calculated based on the corrected coordinate information. Moreover, the AF sensitivity may be calculated by converting a change of the characteristics, such as a light receiving sensitivity, of a focal point detection pixel of the image sensor 21 to an angle, changing the emission angular range, and performing the calculation.

While the present embodiment has been explained using a digital camera as a device for photographing, the camera may be a digital single-lens reflex camera, a compact digital camera, a camera for a moving image such as a video camera and a movie camera, or a camera built in a mobile phone, a smartphone, a mobile information terminal (PDA: Personal Digital Assist), a personal computer (PC), a tablet-type computer, a game device or the like. In any case, the present invention can be applicable to any device that performs the focal point adjustment based on the pupil division image-plane phase difference method.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:
1. A focal point adjustment device, comprising:
an image sensor having focal point detection pixels, each of which receives a light flux having passed through a photographic lens and performs photoelectric conversion to output an image signal;
a first memory to store information on an emission angular range of a light flux emitted toward the image sensor;

a second memory to store information on characteristics of the image sensor;

a camera-shake preventing mechanism to correct camera shake by moving the image sensor in a direction perpendicular to an optical axis of the photographic lens; and a calculation circuit to calculate information for focal point adjustment based on outputs of the focal point detection pixels, based on outputs of the first memory, outputs of the second memory, and outputs of the camera-shake preventing mechanism, wherein information on the movement includes information on rotation of the image sensor, and the calculation circuit corrects image height information at a range-finding position where the outputs of the focal point detection pixels are used, based on the information on the movement output by the camera-shake preventing mechanism, and calculates information for the focal point adjustment, based on the corrected image height information.

2. The focal point adjustment device according to claim 1, wherein a coordinate system which is rotated in accordance with the image sensor is used for the corrected image height information used by the calculation circuit.

3. The focal point adjustment device according to claim 1, wherein the information on the emission angular range is an incident angle and an angular range of a light flux.

4. The focal point adjustment device according to claim 1, wherein the first memory holds the information on the emission angular range for each state of a photographic lens.

5. The focal point adjustment device according to claim 4, wherein the photographic lens has a zoom function, and the state of the photographic lens is information on a zoom position.

6. The focal point adjustment device according to claim 4, wherein the photographic lens includes s focus lens, and a state of the photographic lens is information on a position of the focus lens.

7. The focal point adjustment device according to claim 4, wherein the photographic lens includes an aperture and a state of the photographic lens is information on an opening of the aperture.

8. The focal point adjustment device according to claim 1, wherein the information on characteristics of the image sensor is oblique incidence characteristics of the focal point detection pixels.

9. The focal point adjustment device according to claim 1, wherein the information for the focal point adjustment is a conversion coefficient for converting phase difference detection information based on the output of the focal point detection pixel to a defocus amount.

10. The focal point adjustment device according to claim 1, wherein the information on characteristics of the image sensor is information on an individual difference of the oblique incidence characteristics.

11. A focal point adjustment method for an imaging device including: an image sensor having focal point detection pixels, each of which receives a light flux having passed through a photographic lens and performs photoelectric conversion to output an image signal; a memory to store information on an emission angular range of a light flux emitted toward the image sensor and information on characteristics of the image sensor; and a camera-shake preventing mechanism to correct camera shake by rotating the image sensor in a plane perpendicular to the optical axis of the photographic lens and output information on the movement, wherein information on the movement includes information on rotation of the image sensor, the focal point adjustment method comprising:

setting a focal point detection region for the image sensor;

generating a focal point adjustment signal, based on outputs of a plurality of focal point detection pixels included in the focal point detection region; and correcting image height information at a position of the focal point detection region, based on outputs of the memory, the information on the movement output by the camera-shake preventing mechanism, and calculating information for generating the focal point adjustment signal, based on the corrected image height information.

12. The focal point adjustment method according to claim 11, wherein the corrected image height information uses a coordinate system which is rotated in accordance with the image sensor.

13. The focal point adjustment method according to claim 11, wherein the information on the emission angular range is an incident angle and an angular range of a light flux.

14. The focal point adjustment method according to claim 11, wherein the information on characteristics of the image sensor is oblique incidence characteristics of the focal point detection pixel.

15. The focal point adjustment method according to claim 11, wherein the information for generating the focal point adjustment signal is a conversion coefficient for converting phase difference detection information based on the output of the focal point detection pixel to a defocus amount.

16. The focal point adjustment method according to claim 11, wherein the information on characteristics of the image sensor is information on an individual difference of the oblique incidence characteristics.

* * * * *